United States Patent
Zivojnovic et al.

(10) Patent No.: US 9,690,354 B1
(45) Date of Patent: Jun. 27, 2017

(54) AUTOMATIC ENERGY DESIGN AND MANAGEMENT SYSTEM FOR ASSESSING SYSTEM COMPONENTS' ENERGY CONSUMPTION, COMPILING ENERGY MANAGEMENT CONTROL AND OPTIMIZING ENERGY USAGE

(71) Applicant: AGGIOS INC., Irvine, CA (US)

(72) Inventors: Vojin Zivojnovic, Irvine, CA (US); Davorin Mista, Irvine, CA (US); Mirela Simonovic, Belgrade (RS); Strahinja Jankovic, Belgrade (RS)

(73) Assignee: AGGIOS, Inc., Irvine, CA (US)

( * ) Notice: Subject to any disclaimer, the term of this patent is extended or adjusted under 35 U.S.C. 154(b) by 98 days.

(21) Appl. No.: 14/271,359

(22) Filed: May 6, 2014

Related U.S. Application Data

(60) Provisional application No. 61/820,165, filed on May 6, 2013.

(51) Int. Cl.
*G06F 9/00* (2006.01)
*G06F 1/32* (2006.01)

(52) U.S. Cl.
CPC .................... *G06F 1/3234* (2013.01)

(58) Field of Classification Search
CPC ....... G06F 1/3243; G06F 1/3246; G06F 9/545
USPC ....... 713/300, 320, 323, 164, 100, 310, 322; 714/25, 425; 718/1
See application file for complete search history.

(56) References Cited

U.S. PATENT DOCUMENTS

| | | | | | |
|---|---|---|---|---|---|
| 6,105,142 | A * | 8/2000 | Goff | ...................... | G06F 1/3203 713/320 |
| 6,131,166 | A * | 10/2000 | Wong-Insley | .......... | G06F 9/542 713/300 |
| 6,167,511 | A * | 12/2000 | Lewis | ...................... | G06F 8/66 709/221 |
| 6,185,677 | B1 * | 2/2001 | Nijhawan | ................. | G06F 1/26 713/100 |
| 6,601,178 | B1 * | 7/2003 | Gulick | .................. | G06F 13/385 713/300 |
| 7,287,190 | B2 * | 10/2007 | Rosenman | .......... | G06F 11/2294 714/25 |
| 8,990,599 | B2 * | 3/2015 | Welter | .................. | H04W 52/28 709/226 |

(Continued)

*Primary Examiner* — Aurel Prifti
(74) *Attorney, Agent, or Firm* — Knobbe, Martens, Olson & Bear, LLP

(57) ABSTRACT

The Control Layer IO System ("CLIOS") software is an energy management system taking into account the performance requirements of the target software and the properties and limitations of the target hardware to optimize energy use of a programmable electronic device. CLIOS is generated in a one-time process and once generated is loaded onto the target. CLIOS is complementing or replacing the power management infrastructure of the main operating system. CLIOS comprises three main components: the CLIOS daemon that operates in the user space; the CLIOS driver that operates in the kernel of the main operating system; and the CLIOS kernel, which can run on an auxiliary core if present in the system. CLIOS can be structured to take advantage of various architectural features of a system, ranging from simple single-core designs to heterogeneous, multi-core systems comprising one or more low power auxiliary cores.

25 Claims, 23 Drawing Sheets

(56) References Cited

U.S. PATENT DOCUMENTS

| | | | | |
|---|---|---|---|---|
| 8,990,639 B1* | 3/2015 | Marr | G06F 11/30 | 714/25 |
| 2006/0020834 A1* | 1/2006 | Qureshi | G06F 1/26 | 713/300 |
| 2007/0300061 A1* | 12/2007 | Kim | G06F 21/56 | 713/164 |
| 2008/0046709 A1* | 2/2008 | Wang | G06F 9/4403 | 713/2 |
| 2009/0210726 A1* | 8/2009 | Song | G06F 11/3006 | 713/300 |
| 2009/0313484 A1* | 12/2009 | Millet | G06F 1/30 | 713/300 |
| 2010/0005326 A1* | 1/2010 | Archer | G06F 1/32 | 713/320 |
| 2010/0115273 A1* | 5/2010 | Chittigala | G06F 9/5016 | 713/164 |
| 2010/0117579 A1* | 5/2010 | Culbert | G06F 1/20 | 318/471 |
| 2010/0146497 A1* | 6/2010 | Kogan | G06F 8/65 | 717/170 |
| 2011/0055607 A1* | 3/2011 | Hughes | G06F 1/3203 | 713/323 |
| 2011/0138206 A1* | 6/2011 | Garcia-Tobin | G06F 1/3203 | 713/322 |
| 2012/0054511 A1* | 3/2012 | Brinks | G06F 1/26 | 713/310 |
| 2012/0167109 A1* | 6/2012 | Muralidhar | G06F 1/28 | 718/103 |
| 2013/0007481 A1* | 1/2013 | Chakra et al. | G06F 1/3206 | 713/320 |
| 2013/0151869 A1* | 6/2013 | Steinman et al. | G06F 1/324 | 713/300 |
| 2013/0290751 A1* | 10/2013 | Mondal | G06F 1/3206 | 713/320 |
| 2014/0082384 A1* | 3/2014 | De Cesare | G06F 1/3206 | 713/320 |

* cited by examiner

| SCENES / DEVICES: | SCENE 1 ON-LOW | SCENE 2 OFF | SCENE 3 MOVIE ON | SCENE 4 DINNER ON-LOW | SCENE 5 PARTY ON-LOW |
|---|---|---|---|---|---|
| MPU | ON | OFF | ON | ON | ON |
| PFE | IDLE | OFF | ON | ON-LOW | ON-LOW |
| WAN | IDLE | OFF | ON | - | - |
| LAN | IDLE | OFF | - | - | ON |
| DECT | IDLE | OFF | - | ON | - |
| FXS | IDLE | OFF | - | - | - |
| USB | ON | ON | - | - | - |
| Timer | | | | | |

*Figure 2*

AUTOMATIC ENERGY DESIGN AND MANAGEMENT SYSTEM FOR ASSESSING SYSTEM COMPONENTS' ENERGY CONSUMPTION, COMPILING ENERGY MANAGEMENT CONTROL AND OPTIMIZING ENERGY USAGE

PRIOR CLAIM OF PRIORITY

This invention claims priority to U.S. Provisional Patent Application No. 61/820,165 filed on May 6, 2013 titled "Automated Power Management System" which is incorporated by reference in its entirety.

BACKGROUND OF THE INVENTION

Field of the Invention

This invention provides an automatic energy design and management system based on energy proportionality between the energy consumed and the work delivered by the device. Specifically, this invention relates to the energy design management of electronic devices by adjusting the energy consumption of selected components of the device in an energy proportional manner.

RELATED ART

Energy design flow is typically disconnected and lacks the formats, interfaces and automated methodologies long established in functional design and verification of hardware and software. Additionally, recent innovations in hardware and software further complicate adequately managing energy consumption by components. For example: (1) complex clock trees, multiple voltage domains, numerous operating states, elaborate state retention mechanisms, intertwined energy constraints and dependencies with delicate timing, energy control partitions, energy oriented hardware hierarchies (including processor hierarchies) and other new features required for energy proportionality demand faster, finer and smarter energy design and management solutions; (2) multiple diverse OSes running on multiple heterogeneous processor clusters require full awareness and control of energy events, states, points and scenarios at the application, OS and power management level to keep the work and invested energy in proportions and maintain the energy management synchronization; and (3) the apps paradigm and the reactive nature of modern devices require energy-aware software design and software-aware energy management.

There is a need for solutions to these challenges in order to guarantee the best operational characteristics including energy savings, correctness by construction, shortest possible time to market through extensive reuse, full hardware intellectual property protection, easy programming and efficient collaboration. Existing power design solutions, like OSPM, ACPI, cpufreq, devfreq, runtime_pm and the PM framework do not provide adequate solutions for these complex problems. Thus, a need exists for an automated energy design management solution that can control the energy consumption of components and anticipate problems that may occur and estimate potential solutions based on the energy feedback.

SUMMARY

The Control Layer IO System ("CLIOS") software is an energy management system taking into account the performance requirements of the target software and the properties and limitations of the target hardware to optimize energy use of a programmable electronic device. CLIOS is generated in a one-time process and once generated is loaded onto the target. CLIOS comprises three main components: the CLIOS daemon; the CLIOS driver; and the CLIOS kernel. The CLIOS daemon reacts to environmental and user impacts such as emergency states or actions initiated by the user. Information on these impacts may then be passed along to the CLIOS driver. The CLIOS driver monitors the activities of the CLIOS Daemon, the tasks and the power manager of the main operating system. The CLIOS driver also communicates the relevant events to the energy management kernel running on the always-on core, which is responsible for the execution of the scenes transitions.

CLIOS complements or replaces the power management infrastructure of the main operating system. CLIOS can be structured to take advantage of various architectural features of a system ranging from simple single-core designs to heterogeneous, multi-core systems comprising one or more auxiliary cores.

Other systems, methods, features, and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DETAILED DESCRIPTION OF THE DRAWINGS

The components in the figures are not necessarily to scale, emphasis being placed instead upon illustrating the principles of the invention. In the figures, like reference numerals designate corresponding parts throughout the different views.

FIG. 2 is a table illustrating the use cases describing various scenes and user activities.

DETAILED DESCRIPTION

Figure 1:
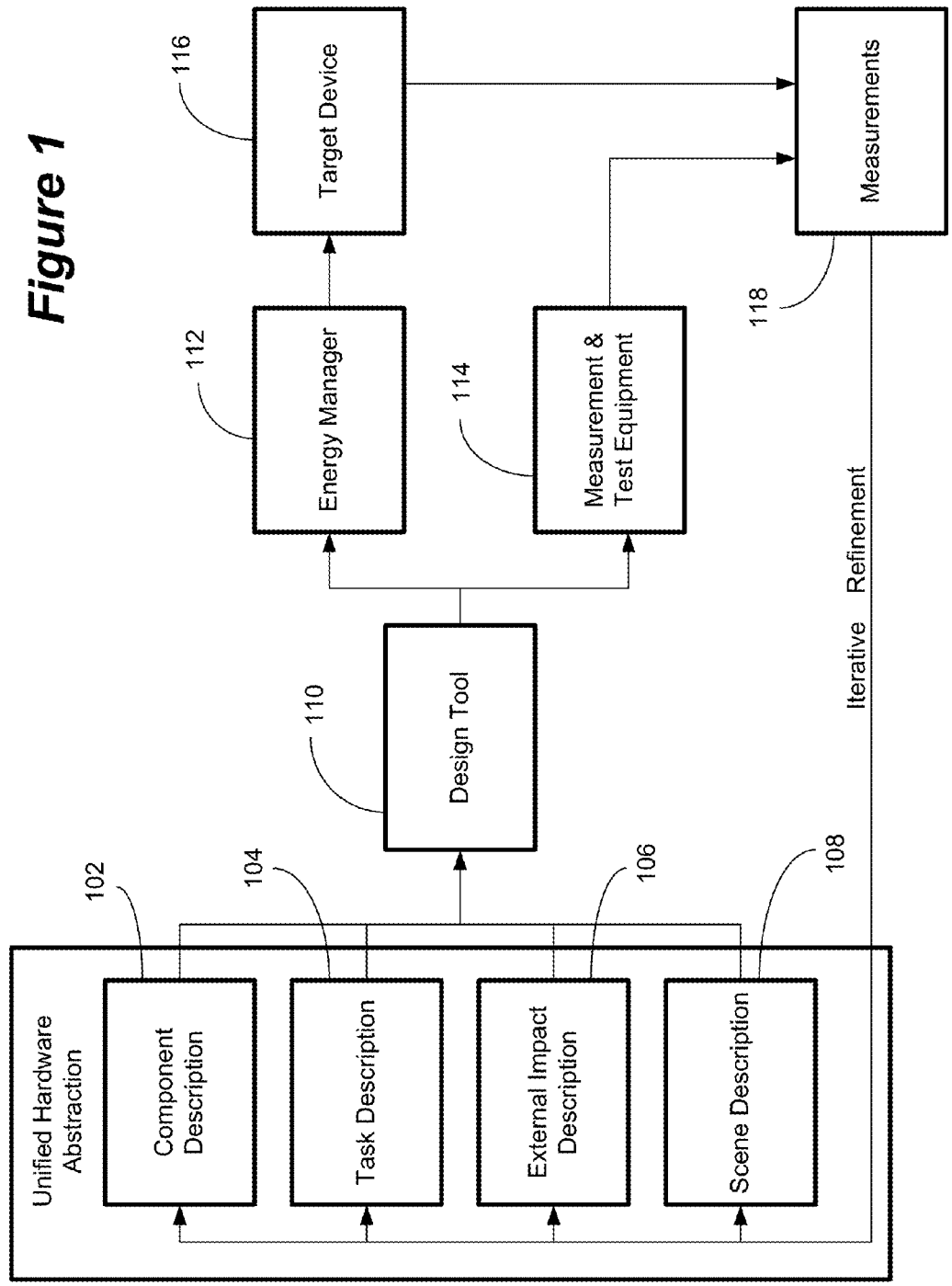
FIG. 1 is a block diagram illustrating the iterative refinement process for the Unified Hardware Abstraction of a target system.

The basic principle of run-time energy management for electronic devices is to reduce device activity or to minimize or turn off individual device hardware components, without impacting end-user quality of experience. The mention of the term "energy" in this patent also applies to temperature, security, safety and other operating characteristics. Although the basic principle is relatively simple, its implementation in real life devices has proven to be a major challenge. This complexity stems from the large number of hardware components and their interdependencies, intricate hardware-software relationships and unavoidable switching latencies due to the natural inertia of hardware and software. These factors complicate the collaboration between hardware developers, device integrators and software developers working on the same device. As a consequence, the energy saving potential resulting from hardware components is either (1) underutilized by the software; or (2) not utilized at all. In both instances, solutions result in delivery of suboptimal products.

The use of a unified hardware abstraction ("UHA") and the associated software layers allows a programmer to focus on energy related details of all components which are controllable through software/firmware directly or indirectly. Essentially, UHA describes the programmer's view of the system focusing on energy related details of all components that are controllable through software, either directly (direct access of registers through memory mapping) or indirectly (e.g. access via intermediary components). A UHA description also covers software and its influences on component and system states. System states are captured using the concept of UHA Scenes and Transitions. The controllable aspects may be directly controlled by the direct access of registers through memory mapping and indirectly by granting access through intermediary components. The UHA description may also include the influence that software has on various component and system states, which may be captured using UHA tasks and impacts.

UHA scenes may be used to describe typical application use cases for particular devices. Scene transitions describe how these scenes are entered by the device or put another way, the condition in which the system transitions from scene to scene. Scene requirements may be expressed on a component-by-component basis where each component taking part in the scene is further expressed by its state, capabilities or quality of service.

The energy management system leverages the energy profile of a device hardware and software with application and user activity information in order to automatically generate the optimum run-time energy management software and setup the test and measurement equipment. The automatically generated software centralizes the information collection, decision-making and actions into one process, and thus has full control over all aspects of the energy requirements and consumption.

Automated System, Design Methodology and Test of Device Energy Management.

The iterative refinement process for the Unified Hardware Abstraction of a target system is illustrated in FIG. 1. The structure of the automated energy management system comprises the descriptions of the hardware components 102, software tasks 104, external impact descriptions 106, and use cases also known as scenes descriptions 108 that are described in a high level abstraction either using an external text editor or the data entry capabilities provide the inputs for the design tool 110. These descriptions are formalized to create specific rules that can be analyzed by the design tool 110.

The design tool 110 compiles the component descriptions 102, task descriptions 104, external impact descriptions 106 and scene descriptions 108, respectively, in order to generate into potentially multiple files using software such as C/assembly, for the target specific software definition of the energy manager 112. The output of the design tool 110 is sent to the energy manager 112 and the measurement and test equipment module 114. Verilog/VHDL formats may be used for the hardware definition of the energy manager 112 as well as for the data files containing additional hardware and software parameters and the setup information for the test and measurement equipment 114. The resulting hardware definition files are compiled into energy manager register transfer level ("RTL") description for the hardware synthesis and energy manager loadable image for the software executing on the processors of the target device 116. The RTL description can be used to synthesize a hardware circuitry or map on an FPGA. The resulting software definition files are compiled into the loadable image for the energy manager 112 to be run on the physical target or a virtual prototype representing the target.

The target device 116 may be inserted into a test bench for which the setup is automatically generated and the measurement procedures for voltage, current, power, energy and temperature measurements may be conducted. The measurement results are generated from input from the measurement and test equipment module 114 and the target device 116. The measurement results 118 are used to modify the component descriptions 102, task descriptions 104, external impact description 106 and scene descriptions 108 by an iterative process and govern the overall development process. This iterative process may be repeated until satisfactory results are achieved.

Component, Task, Impact and Scene Descriptions.

The component descriptions 102, task descriptions 104 and environmental and user impact descriptions 106 as illustrated in FIG. 1 describe: (1) clock trees, voltage rail trees, power clamps, reset trees and their hardware and software control; (2) the programmer's view of SoC and board components such as processors, busses, memories, accelerators, controllers with their operating states annotated with power, temperature, capability, latency, constraint, retention, transition and quality of service information; (3) constraints and inter-component dependencies; (4) software routines, OS task, processes and threads and applications annotated with their energy profiles; and (5) environmental and user impacts on device's energy behavior. UHA introduces the new scene concept, which describes typical use cases, and user activities conducted on the device combined with energy consumption and quality of service information. Scenes are combined and transitioned by the CLIOS run-time software using user defined scene transition tables and a set of elementary scene combination rules.

An example of the use of scene descriptions is provided in FIG. 2. In FIG. 2, hardware components such as WAN 200, LAN 202, USB 204 or Timer 206 devices are shown in idle states 208, night mode 210, IP traffic 212, FXS-Call 214 or Dect-Call 216 states. Based on the scenes that are identified, the table illustrated in FIG. 2 shows the various states of the components as to whether the device is on, on-low, off or in an idle state.

Figure 3:
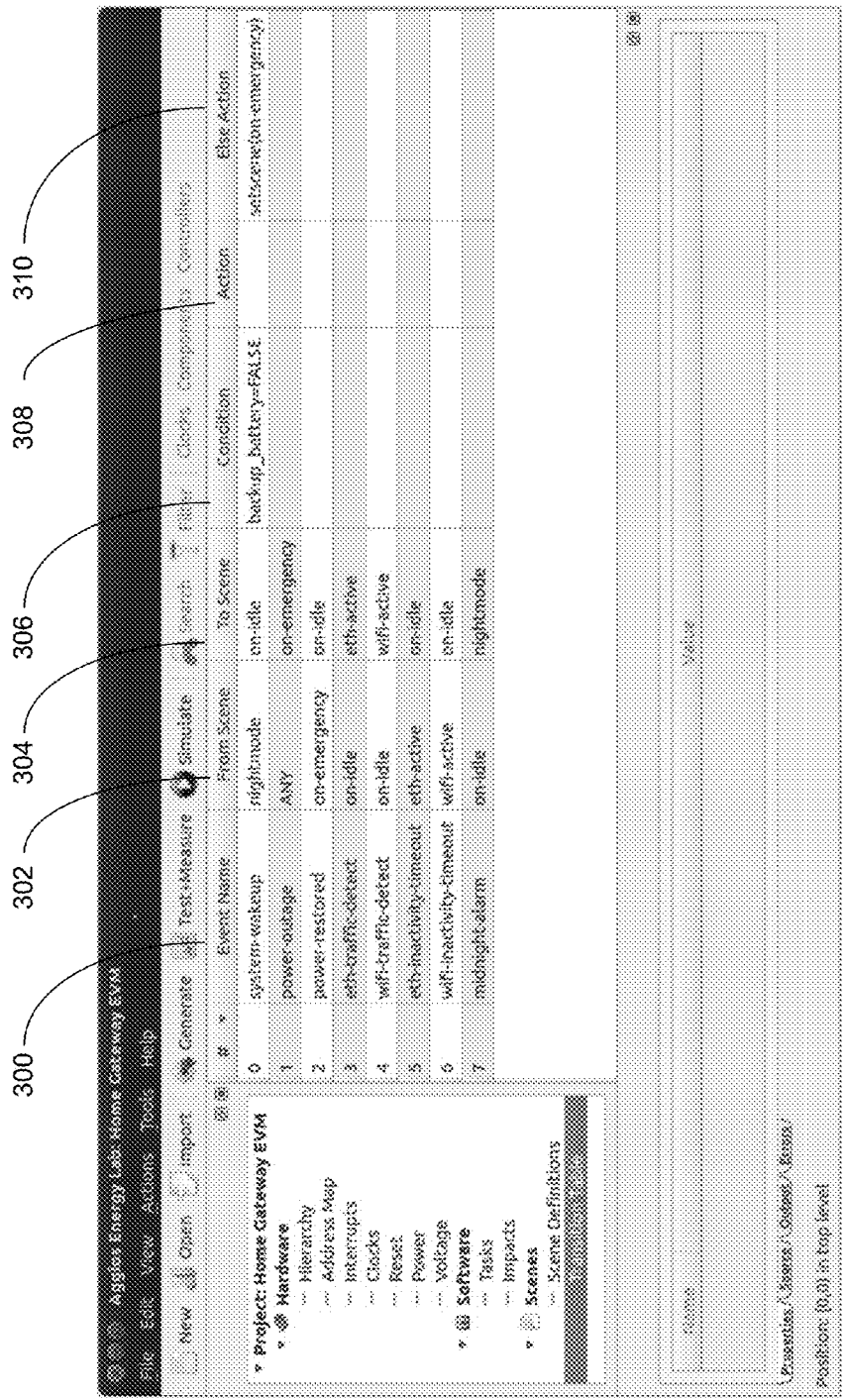
FIG. 3 is a screenshot of the EnergyLab graphical user interface illustrating the scene transition table.

Scenes may be combined and transitioned by the run-time software using user defined scene transition tables as presented on FIG. 3 and a set of elementary scene combination rules and priorities. FIG. 3 is a screenshot of the EnergyLab graphical user interface showing the Scene Transition Table with individual columns for triggering events 300, transitions from a first scene 302 to a second scene 304, the condition required to perform the transition 306, the action to be taken if the transition is performed 308 and the action to be taken if the condition is not true 310. Scenes 302 and 304 describe use cases and user activities typically conducted on a device combined with the device's energy consumption and quality of service information.

Scenes capture the dynamic nature of a device in operation. The scene toolset is part of the design tool and allows the user to specify and/or modify the rules of how the hardware, software and application settings should be applied during certain events originating from the device, the user or the context in order to minimize the device's energy consumption. At its simplest level, the scenes specify the components' power/energy/performance settings and their triggering events. This includes the conditions under which the CPU and any other hardware components should be powered off, powered on, or put into a low power state. At the operating system level, a scene additionally leverages the provisions of the operating system to detect events and specify the appropriate hardware and software settings. At the applications level, the scenes act as the activity profile and gather user preferences to adjust the energy consumption of the device.

Energy Manager.

The energy manager software delivers energy management on the electronic device and complements or replaces the standard OS power management. The main tasks of the energy manager software are: (1) detect and respond to power and energy management directives by the various OSes or during OS transitions on processor hierarchies; (2) during OS suspend periods manage the sleep and dark wake states of the device; (3) coordinate power state changes of components, clusters and subsystems; (4) manage UHA operating states and scenes; (5) execute control code to retain state information during transitions; (6) change power states by directly accessing hardware components, including clock dividers, PLLs and PMICs; (7) provide run-time power and energy estimates; and (8) allow external and direct energy control and energy reporting.

The energy manager accomplishes these tasks and delivers: (1) fast and precise execution of energy state changes; (2) small footprint to fit within local memory of dedicated cores; (3) flexibility to distribute energy management across all the participating cores and OSes; and (4) support for wide range of processors ranging from application processors to dedicated power management processors and generic auxiliary cores.

Figure 4:
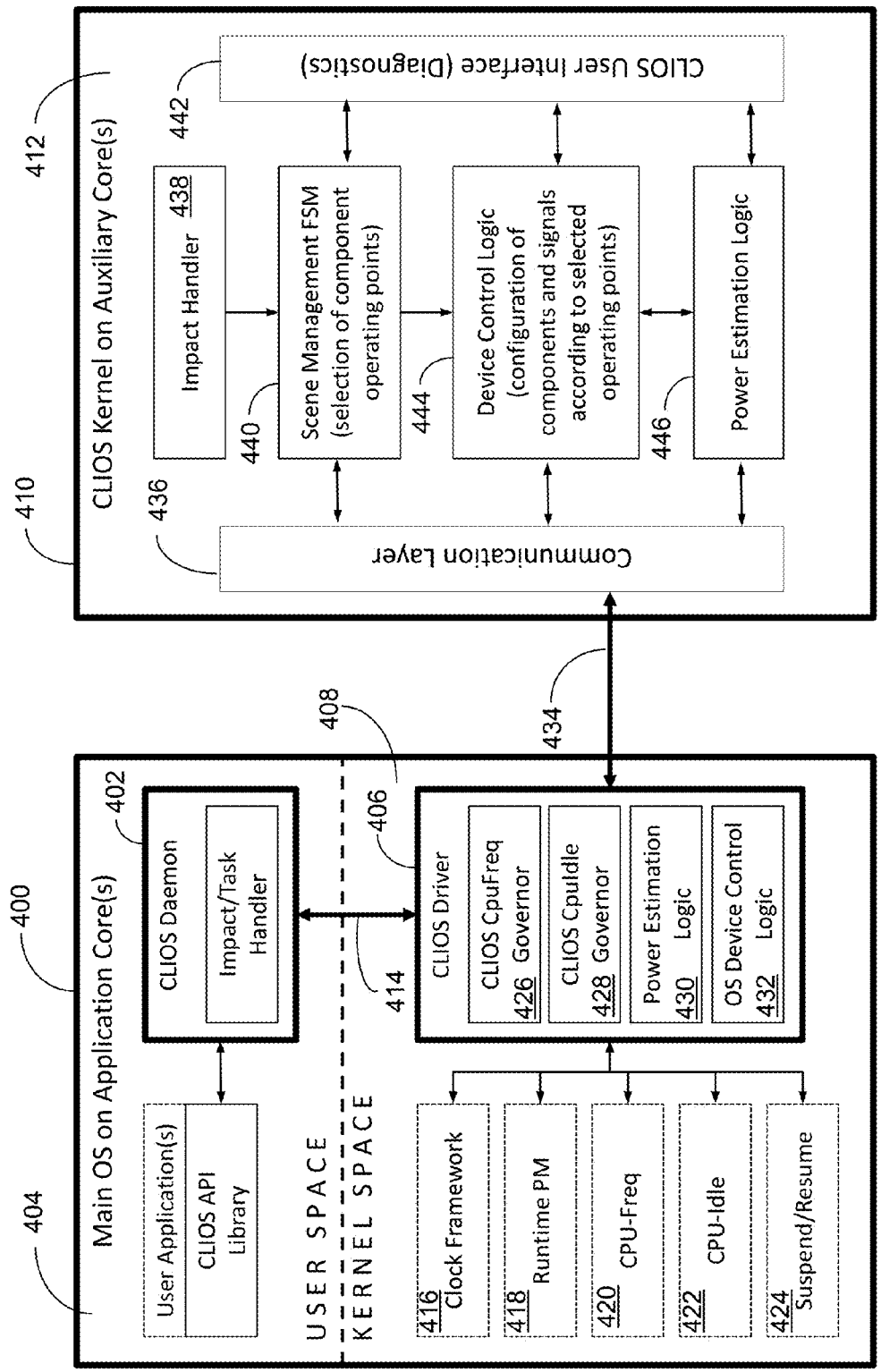
FIG. 4 is a block diagram illustrating the CLIOS Architecture.

FIG. 4 is a block diagram illustrating the CLIOS architecture and illustrates the structure of the CLIOS energy management software for one configuration embodiment comprising one main application processor ("Main Core") 400 running the main OS, in this case Linux and one energy management processor ("Auxiliary Core"), which is typically a smaller microcontroller requiring significantly less power than the main application processors. The foundation of the energy manager software is the Control Layer IO System ("CLIOS") software. CLIOS is generated in a one-time process and once generated it gets loaded onto the target.

CLIOS comprises three main components: (1) the CLIOS Daemon 402 operating in the user space 404; (2) the CLIOS driver 406 operating in the kernel space 408 of the main OS; and (3) the CLIOS kernel 412 which is ideally running on an auxiliary core 410 if present in the system. The CLIOS Daemon 402 reacts to external impacts such as emergency states or applications started by the user. Information on these external impacts is then communicated to the CLIOS driver 406. The CLIOS driver 406 monitors the activities of the CLIOS Daemon 402, the tasks and the power manager of the main OS. The CLIOS driver 406 communicates the relevant events to the energy management kernel on the auxiliary core 400, which is responsible for the execution of the scenes transitions.

The CLIOS Daemon 402 is in communication via path 414 with the CLIOS driver 406. The CLIOS driver 406 also is in communication with the clock framework 416, the runtime PM 418, the CPU-Freq 420, the CPU-Idle 422 and the Suspend/Resume frameworks 424. Functions 416, 418, 420, 422 and 424 exist in operation whether CLIOS is operational and once CLIOS is implemented, they provide information to and receive information from the CLIOS driver 406. In addition, the CLIOS driver 406 is in communication via path 434 with the CLIOS kernel 412 communication layer 436.

The CLIOS driver 406 comprises: (1) the CLIOS Cpu-Freq Governor 426 that controls the logic determining the top frequency for the CPU; (2) CLIOS CpuIdle Governor 428 that puts the CPU asleep, determines policies and how aggressively the system can put the CPU to sleep; (3) the power estimation logic 430 estimates the energy or the amount of power over a time interval taking information from CLIOS and keeping track of the power levels and energy estimations; and (4) OS device control logic 432 controls the power states of the individual components according to the needs of the OS device drivers.

The CLIOS kernel 412 running on the auxiliary core(s) 410 has an impact handler 438 that provides input to the Scene Management FSM selection of component operating states 440. If the auxiliary cores can turn off bigger cores in order to save energy, while leaving the smaller functioning cores on so that CLIOS can run thus saving energy. The Scene Management FSM 440 connects to the communication layer 436 and the user interface that supports diagnostics 442 as well as provides input to the device control logic (configuration of components and signals according to selected operating states) 444. The device control logic 444 receives input from the scene management FSM 440, connects with the communication layer 436 and the CLIOS user interface 442. The CLIOS user interface 442 is primarily used during debugging of the software. The Power Estimation Logic 446, e.g. the energy estimation, connects with the communication layer 436, the device control logic 444 and the CLIOS user interface 442.

CLIOS Partitioning.

CLIOS can be structured to take advantage of various architectural features of a system. For simple systems, CLIOS can be run as a device driver under the main Operating System ("OS"), complementing or replacing the power management infrastructure of the main OS. On heterogeneous, multi-core systems comprising one or more low power auxiliary cores, CLIOS is typically divided into a CLIOS kernel 412 running on the auxiliary cores, as well as a CLIOS driver 406 running under the main OS 400 on the application processors.

This split architecture of the energy management software allows the CLIOS kernel 412 to accelerate the state transitions for the main application processors, minimizing sleep/wakeup latencies, thus allowing the system to go into power saving sleep states more frequently. It also allows CLIOS to continue regulating the system while the main OS is suspended and the main application processors are in a low power mode. The CLIOS kernel 412 can also take over some of the maintenance tasks in order to reduce the number of situations in which the main application processors need to be woken up.

Figure 5:
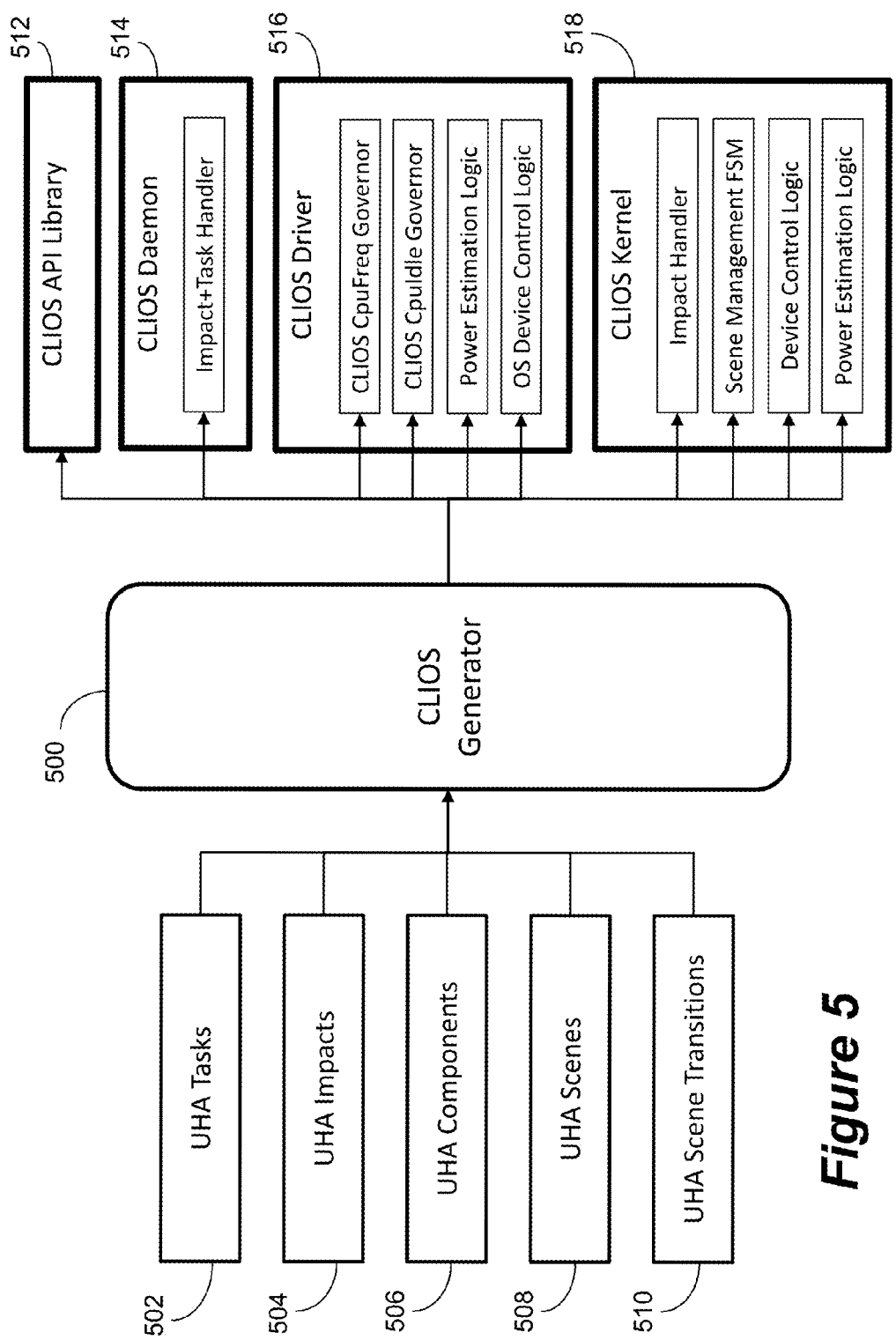
FIG. 5 is a block diagram illustrating the generation of CLIOS from UHA.

FIG. 5 is a block diagram illustrating the generation of CLIOS from UHA. The CLIOS generator 500 processes the information contained in the UHA Tasks 502, UHA Impacts 504, UHA Components 506, UHA Scenes 508 and UHA Scene Transitions 510. The CLIOS generator 500 then can generate the CLIOS API Library 512, the CLIOS Daemon 514, the CLIOS Driver 516 and the CLIOS Kernel 518. The CLIOS generator manages many-to-many relationship structures.

The CLIOS generator 500 is executed at the manufacturer of the device. The CLIOS generator outputs and builds a binary image that gets loaded into the device. CLIOS generator does not run on the device, but is run by an engineer or factory operator during device production and supports customization by the device manufacturer. The CLIOS Daemon 514 is executable code that is loaded at run time on the main core. The CLIOS Driver 516 is loaded at boot time on the main core and the CLIOS Kernel 518 is loaded to an auxiliary core.

UHA Components.

In order to describe the different configurations of a component, functional operating states as well as performance operating states may be defined. Different functional operating states for the same component offer different functional capabilities (e.g. "on/active" versus "off"), while different performance operating states of the same functional operating state offer the same capabilities, but at different energy and performance or quality of service (QoS) levels. Functional operating states are described using UHA operating states, while performance operating states are described using UHA operating points.

The operating states of a component can either be changed through configuration of the component itself via its registers, or through manipulation of the driving signals of the component, including, but not limited to: (1) clock frequency manipulation; (2) clock gating; (3) reset assertion/de-assertion; (4) voltage changes; and (5) power clamping (i.e. switching off the power thus reducing voltage to zero). The signals driving the components (clock, reset, voltage, power) as well as the mechanisms for manipulating those signals are explicitly described in UHA. A signal can either be controlled directly, or through signal controllers, which are used to enforce, dependencies in order to prevent unsafe state changes.

UHA components explicitly declare the dependencies on those signals. Each functional and/or performance operating state can then declare which signal settings as well as component configurations are required in order to detect, or transition into that state.

UHA Tasks and Impacts.

The software's influences on component and system states may be described using UHA tasks 502, external influences and the events they trigger are described using UHA impacts 504. Events caused by external influences are described using UHA impacts 504. UHA impacts 504 can have a state or can be stateless. Examples for UHA impacts 504 are timers, counters, sensors, as well as kernel routines of an operating system detecting events that indicate a change of context or operating mode. Events triggered by UHA impacts 504 can be used to initiate scene transitions 510.

Software may be described using UHA tasks 502. A UHA task 502 can refer to any piece of application software or kernel level code that has well-defined hardware requirements or a well-defined energy profile. A UHA task 502 can either be: (1) an entire application or app; (2) a process; (3) a function; or (4) a block of code. UHA tasks 502 can have specific requirements on components and/or the entire system, by triggering scene changes. UHA tasks 502 can also have energy profiles for scenarios associated with them, used for predicting the energy use of the active task.

UHA Scenes and Transitions.

UHA scenes 508 are used to describe the recommended state settings for specific use cases relevant to the device/system described. Each UHA scene specifies required operating states for a subset of the available components in the system. The transition between scenes is captured in a transition table. A scene transition 510 depends on a triggering event as well as a set of conditions. Each transition may include the specification of a prior scene and a new scene. The prior scene can be one or more (or any) scene, while the new scene must be exactly one scene, which the system will transition to if the conditions are met. Each scene transition can specify a set of side-effect behaviors.

Scene transitions are initiated by events from (1) software tasks starting or ending; (2) impacts such as those generated by the environment or by user influence; and (3) constraints such as violations of operating characteristics limitations. A new scene is chosen based on currently active scene(s), a triggering event, and the observed system state. And typically, at any point in time, only one event is captured during the execution of a scene transition while additional events are queued.

Figure 6:
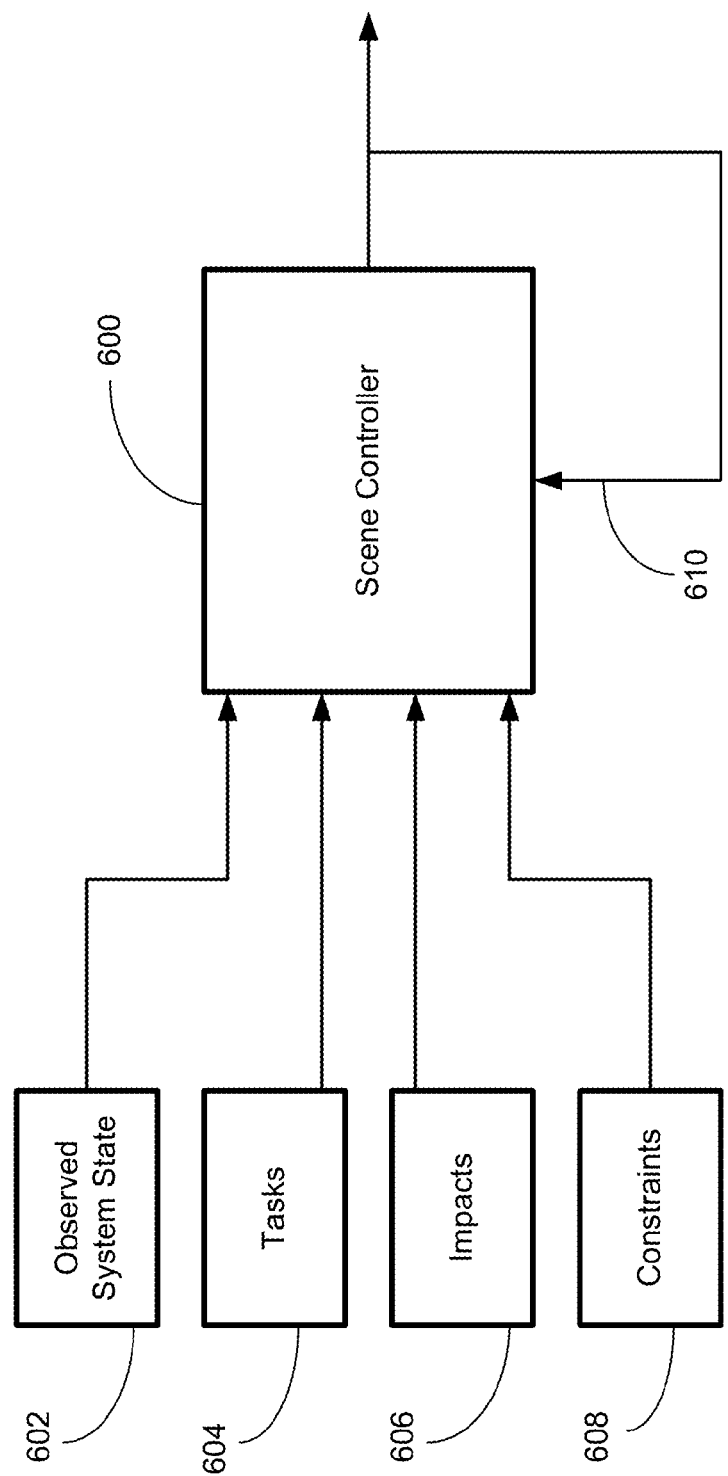
FIG. 6 is a block diagram illustrating the scene controller.

FIG. 6 is a block diagram illustrating the scene controller 600. The observed system state 602, tasks 604, impacts 606 and constraints 608 provide input to the scene controller 600. Two or more scenes may be selected at the same time creating an overlap of scenes. Scenes can be prioritized such that two or more scenes can be processed according to their priority. Higher priority scenes always take precedence over lower priority scenes. In some instances, lower priority scenes will be pre-empted while in other instances the lower priority scenes will be aborted. Lower priority scenes will also be pre-empted if the higher priority scene covers at least one component for which they require an operating state that is not compatible with the lower priority scene. For scenes of equal priority, each component will be set to the highest performance or highest capability operating state demanded by any of the scenes. The scene controller 600 can also provide feedback 610 to further refine the process.

A currently active scene can be terminated naturally or forcefully. A natural termination of a scene may occur by an event that explicitly ends the scene according to the transition table indicating that the need for the function associated with that scene has expired. A forceful termination of a scene may occur when a scene requires an incompatible operating state in one of the components. When a forceful termination occurs, CLIOS includes a callback API that creates a notification of the forceful termination of a scene.

Figure 7:
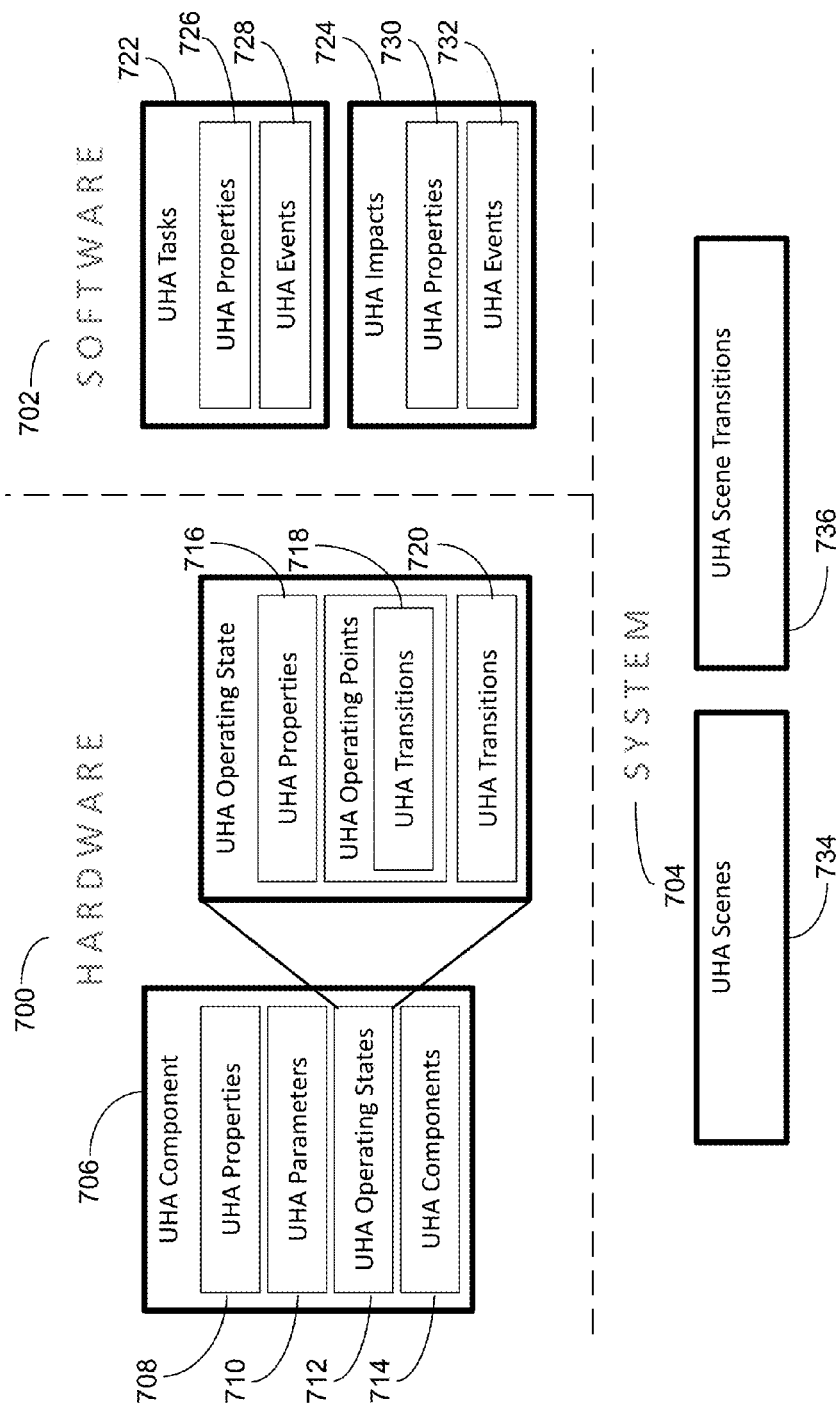
FIG. 7 is a block diagram illustrating the different UHA elements.

FIG. 7 is a block diagram illustrating the main elements of the UHA description format. The primary element of the UHA description format is the node. Nodes are used to describe the hardware components 700, software components 702 and system attributes 704. A UHA Component 706 describes hardware components through UHA properties 708, UHA parameters 710, UHA operating states 712, as well as other UHA components 7714 forming a hierarchy. UHA operating states 712 describe the different power/performance configurations of a component using UHA properties 716 and UHA operating points. UHA transitions 718/720 describe the mechanics of how to enter a specific operating state.

The clock divider is a reserved parameter used for describing hardware clock dividers that includes an additional property factor that describes the actual divider of the frequency while the property value describes what to write into the register in order to divide the clock frequency by the divider factor. The clock divider can support: (1) constant and hardcoded dividers that are not controllable by the software such as when it does not have a specified address; (2) a divider whose factor and value are directly mapped, e.g. when the factor equals the value and all the values that could be written into the clock divider bit fields are allowed; (3) the divider whose factor and value are not directly mapped but all values that could be written in the clock divider bit fields are allowed; enumerated values and factors which is used when not all the values that can be written in the clock divider bit fields are allowed; (5) the factor as a formula where the values are not defined and all values would be considered valid; and (6) user defined mapping where the user function is called instead of a generated function.

The software 702 is described using UHA Tasks 722 and UHA Impacts 724. The body of a UHA Task 722 and a UHA Impact 724 contains UHA properties 726 and UHA events 728. The system level aspects are described using UHA scenes 734 and UHA scene transitions 736.

UHA uses a set of hierarchically nested nodes where one node can describe any entity corresponding to an entire system, block, components, software task or impact. Nodes can also be nested in order to establish a hierarchy where the node body comprises properties and parameters as well as sub-nodes. UHA supports the following node types: (1) components, also known as the default node; (2) operating states; (3) operating points; (4) transitions; (5) tasks; (6) impacts; (7) scenes; and (8) scene transitions.

UHA Tasks and UHA Impacts are node types that may be used to describe the influences of software on the energy requirements of the system. The UHA Task construct is typically used in conjunction with the CLIOS API, which notifies CLIOS of any task changes such as tasks starting, ending or transitioning to new segments in the energy profile.

UHA Task requirements are expressed by component capabilities, transition latencies or quality of service constraints. This allows the resulting energy management control software to be aware and adjust to the component energy states. Use of component capabilities and quality of service requirements allows the energy management system to adjust to the various performance operating states of all the components so that they match the requirements of the current tasks that are running while minimizing the overall energy consumption by the system.

UHA Impacts capture the influence of outside events on the system as they are captured by sensors, timers or buttons. An impact can reference an item on a predetermined list and can be defined implicitly as triggers in transition tables. Most impacts are of a type of interrupt, but impacts can be configured by polling based on the property "schedule."

UHA parameters may describe configuration registers of components. Addresses of configuration registers may either be specified as absolute values using the address property or as relative addresses using the offset property. The relevant bits within the register may be enumerated explicitly by the bit properties or the bitmask using the mask property.

Figure 8:
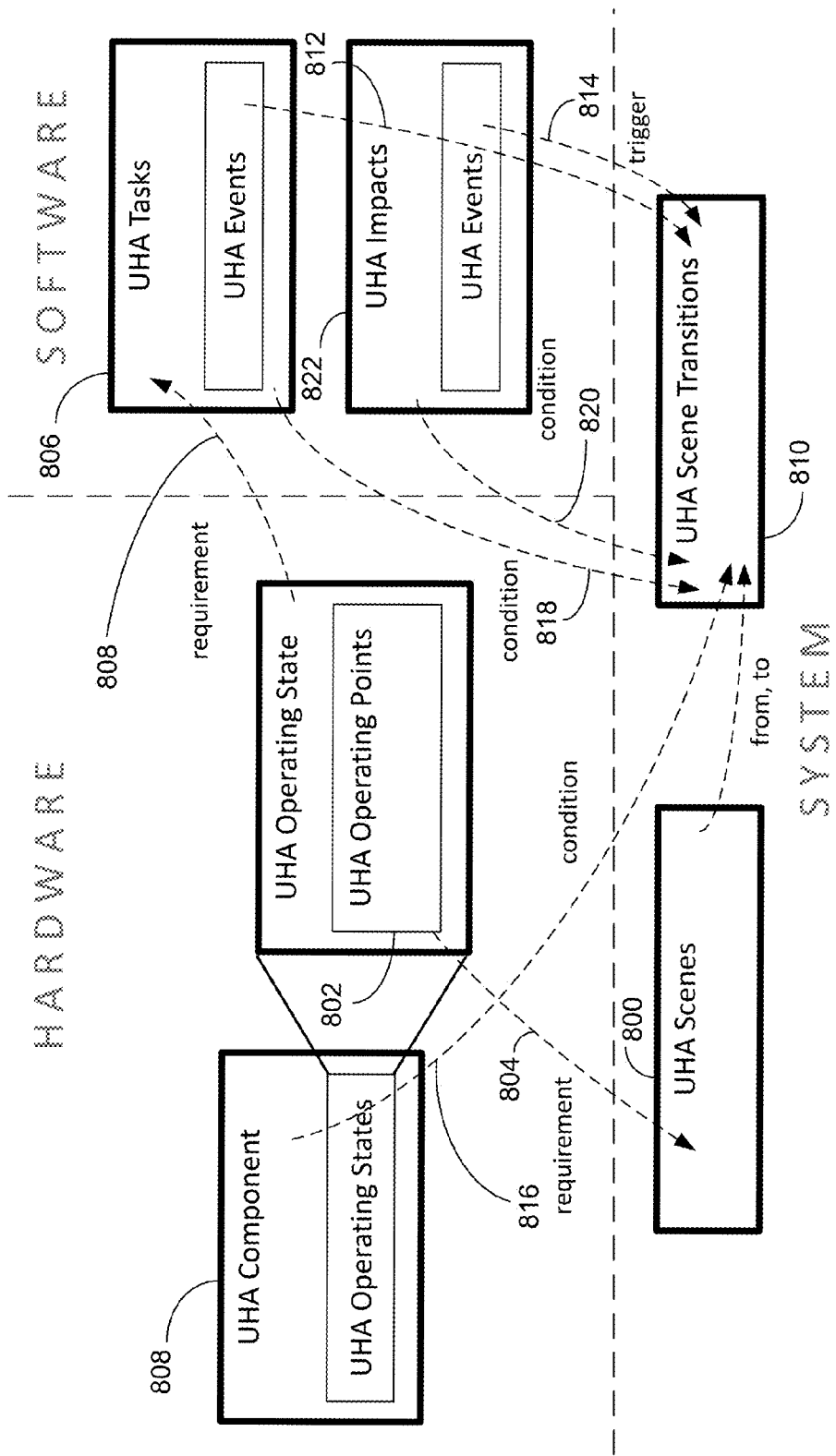
FIG. 8 is a block diagram illustrating the interdependencies between different UHA elements.

FIG. 8 is a block diagram illustrating the most important dependencies between different UHA elements. UHA uses named references to establish dependencies between components. UHA scenes 800 specify the operating states 802 required for a set of components through requirements 804. Similarly, UHA tasks 806 also require 808 a set of operating states 802, or capabilities for certain components 808. UHA scene transitions 810 tie all of the UHA elements together. A transition from one scene 800 to another is triggered by an event 812/814, and performed if a set of specified conditions 816/818/820 is fulfilled. These conditions can be related to hardware components 808, software activity 806, or environmental or user activity 822.

Figure 9:
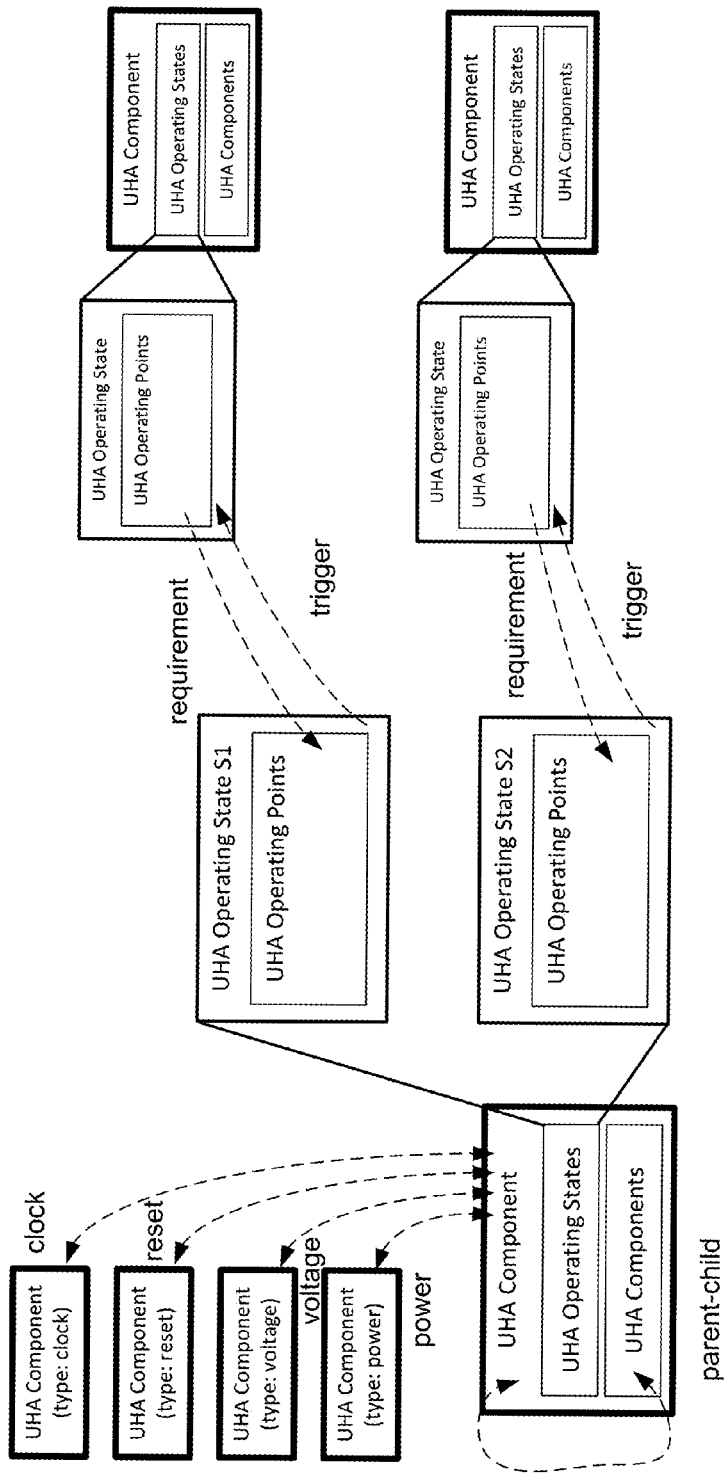
FIG. 9 is a block diagram illustrating the inter-component dependencies between different UHA components.

FIG. 9 is a block diagram illustrating the dependencies between different UHA components. These inter-component dependencies are either through (1) parent-child relationships; (2) clock reset/power/voltage relationships (for example: one component provides the clock to another component); or (3) requirements/trigger dependencies between operating-states of one component and operating-states of other components.

Figure 10:
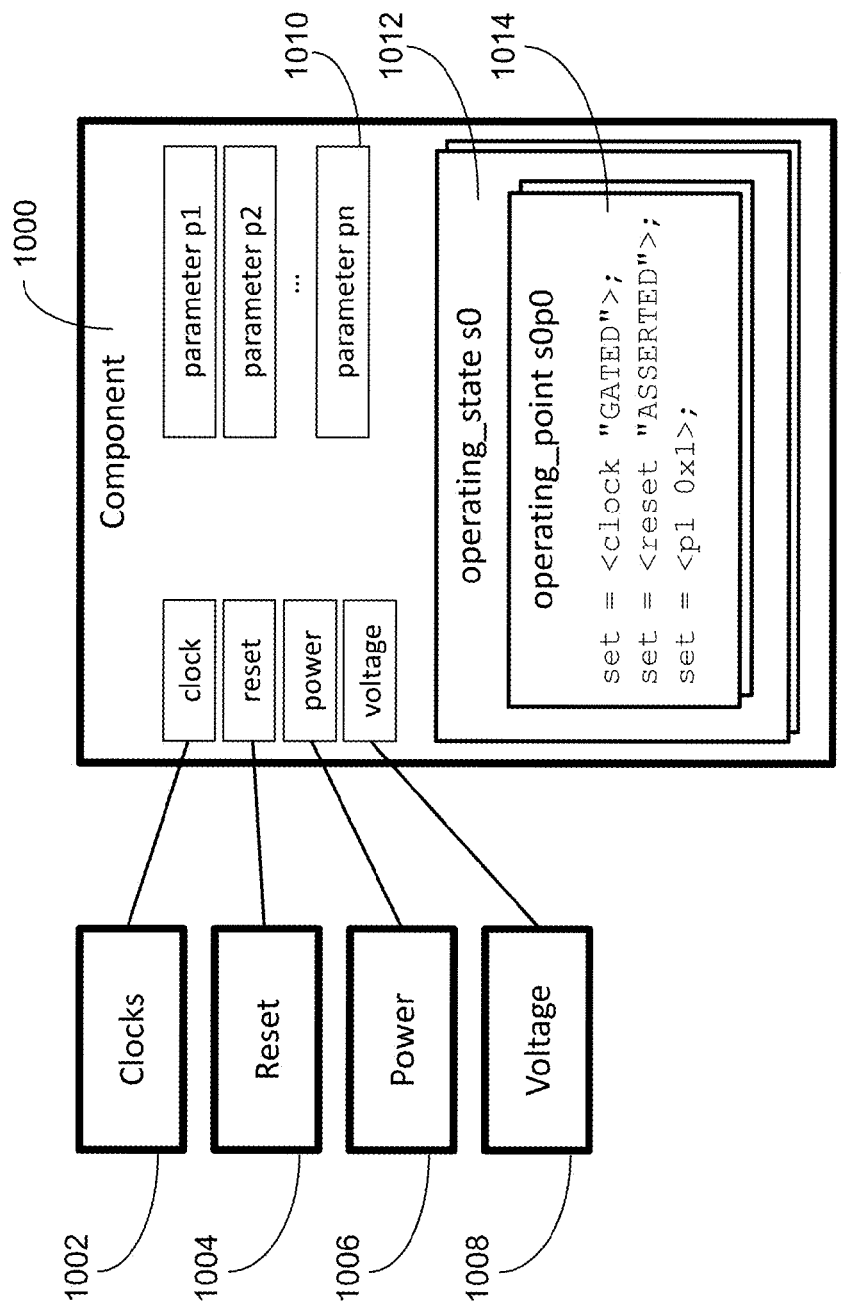
FIG. 10 is a block diagram illustrating the hierarchy of a typical UHA hardware component.

FIG. 10 is a block diagram illustrating the UHA hardware components 1000 comprising clocks 1002, reset 1004, power 1006, voltage 1008, and clock controller, voltage controller, power controller and reset controller (not shown). The component 1000 has associated parameters p1, p2 . . . pn 1010. A component can operate in a variety of operating states 1012 and operating points 1014. Transitions define how to get a component from one operating state to another. FIG. 10 illustrates how the clocks 1002, reset 1004, power 1006 and voltage 1008 are referenced by components and then set depending upon the operating state and operating point of the component.

Component operating states are described in a two level hierarchy where there is a strict parent-child relationship between the functional operating states and the performance operating states. UHA operating states are used to describe the functional states of a component. The functional operating state has at least one performance operating state, described using UHA operating points. These performance operating state(s) are used to describe different component configurations while providing the same functional state, but at different power and performance levels. UHA operating points may also include properties describing the power model of the component at that performance operating state.

Components can use different power models depending on their complexity and modeling accuracy. Thereby each operating state can have its own power model assigned. In its most simple form a component can have constant power consumption while in a specific operating state. Additionally, UHA supports power and energy equations depending on user-defined parameters, as well as software-centric power modeling, where UHA tasks are annotated with energy profiles. Energy profiles can either be generic, describing the task's influence on overall energy consumption, but they can also be specific to a particular component or a voltage rail.

Special properties may be used to define what happens when an operating state is entered. These special properties may include (1) the property "set" which is when the parameter is set to a new value; (2) the property "requires" is a dependency condition that requires another component to provide a capability; and (3) a property "trigger" where a side effect triggers another component to enter a specific operating state. The property "set" specifies the parameter settings needed to enter into a specific operating state. Simple transitions use the property "set" within an operating state. If a transition requires (1) a sequence of changes and/or register settings; or (2) a transition sequence that depends on a current state, then the transition node can be used to describe the exact sequence.

The property "requires" specifies any dependencies where the component requires another component to be in a specific state to provide a specified capability or quality of service. The property "triggers" is used to express that when a component enters a new operating state, it triggers another component to change its state.

CLIOS comprises energy management software that controls the state of all components in a system while keeping track of the consumed energy as well as monitoring and controlling other operating characteristics, such as temperature, safety, and security. CLIOS comprises a fixed generic portion containing the control algorithms and decision logic, as well as a flexible target specific portion, containing all of the architectural details of the hardware and software to be controlled, as well as all of the operating characteristics. The target specific portion is generated by the EnergyLab tool out of a UHA description of the system.

Dependencies may be present between components. In order for one component to enter a certain operating state, it requires another component to be in a certain operating state. Thus, a component A in state S0 requires component B to be in state S1. Dependency constraints simply extend the scope of a scene, e.g. components not explicitly mentioned in the scene may still be affected when entering that scene. Thus, a PCI-Bus child that's explicitly required to operate at max speed for a scene may also force the PCI-Bus to operate at a certain operating point, even though the PCI-Bus isn't explicitly mentioned in that scene.

Constraints may also exist in the system. These constraints define requirements for operating characteristics of a component, subsystem, or device. The constraints may emit events that can trigger scene transitions, e.g. entering panic or recovery modes. Before any scene transition (upon any event) the scene controller can use the information it has about how component settings affect constraints, to predict a constraint violation and therefore decide whether to take preventive measures. For example, it can reduce CPU frequency to prevent a temperature constraint violation.

Figure 11:
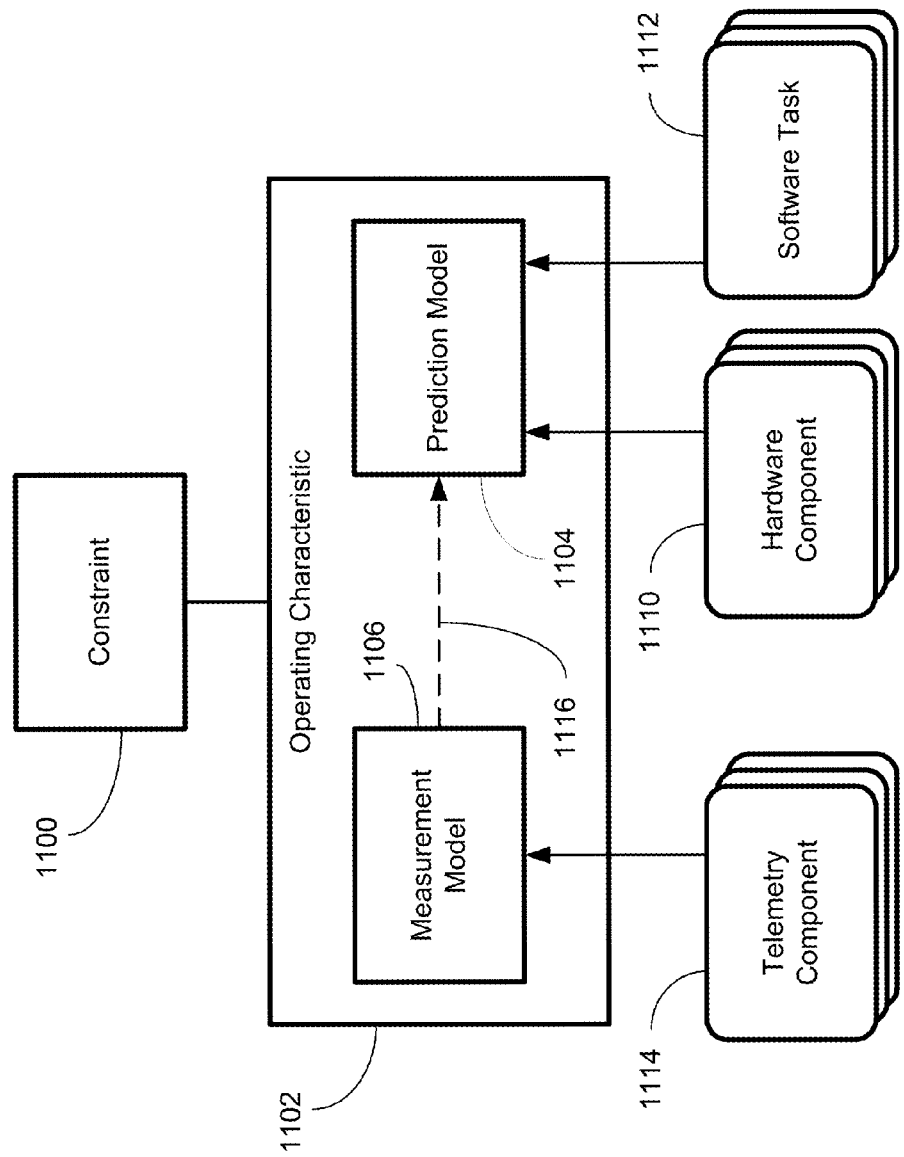
FIG. 11 is a block diagram illustrating the models defined within an operating characteristic.

FIG. 11 is a block diagram of constraints 1100 that act as limitations on the operating characteristics of the device. The operating characteristics 1102 of the device describe the physical characteristics such as temperature, current, power, etc. as well as derived characteristics such as user defined characteristics like throughput or the sum of two or more values, (e.g. the sum of power and frequency creates a new user defined operating characteristic).

The operating characteristics may include two calculation models: (1) prediction model 1104; and (2) measurement model 1106. The prediction model 1104 measures how the parameters and operating states of the components and tasks related to the operating characteristics. This can be expressed as a mathematical formula, a lookup table or a combination of both. The prediction model 1104 can include parameters and operating states of hardware components 1110 and software tasks 1112.

The measurement model 1106 involves measuring the operating characteristics such as (1) if on-board or on-chip telemetry hardware 1114 is available, the measurement model will describe how to determine the operating characteristics using on-board or on-chip components; (2) if no hardware is available, the measurement model will refer to the prediction model 1116. The telemetry component 1114 is a hardware component that has a UHA description and is capable of measuring something such as a temperature or current sensor. The measurement model 1106 may be expressed as a formula, lookup table or a combination of formula(s) and lookup table(s).

Figure 12:
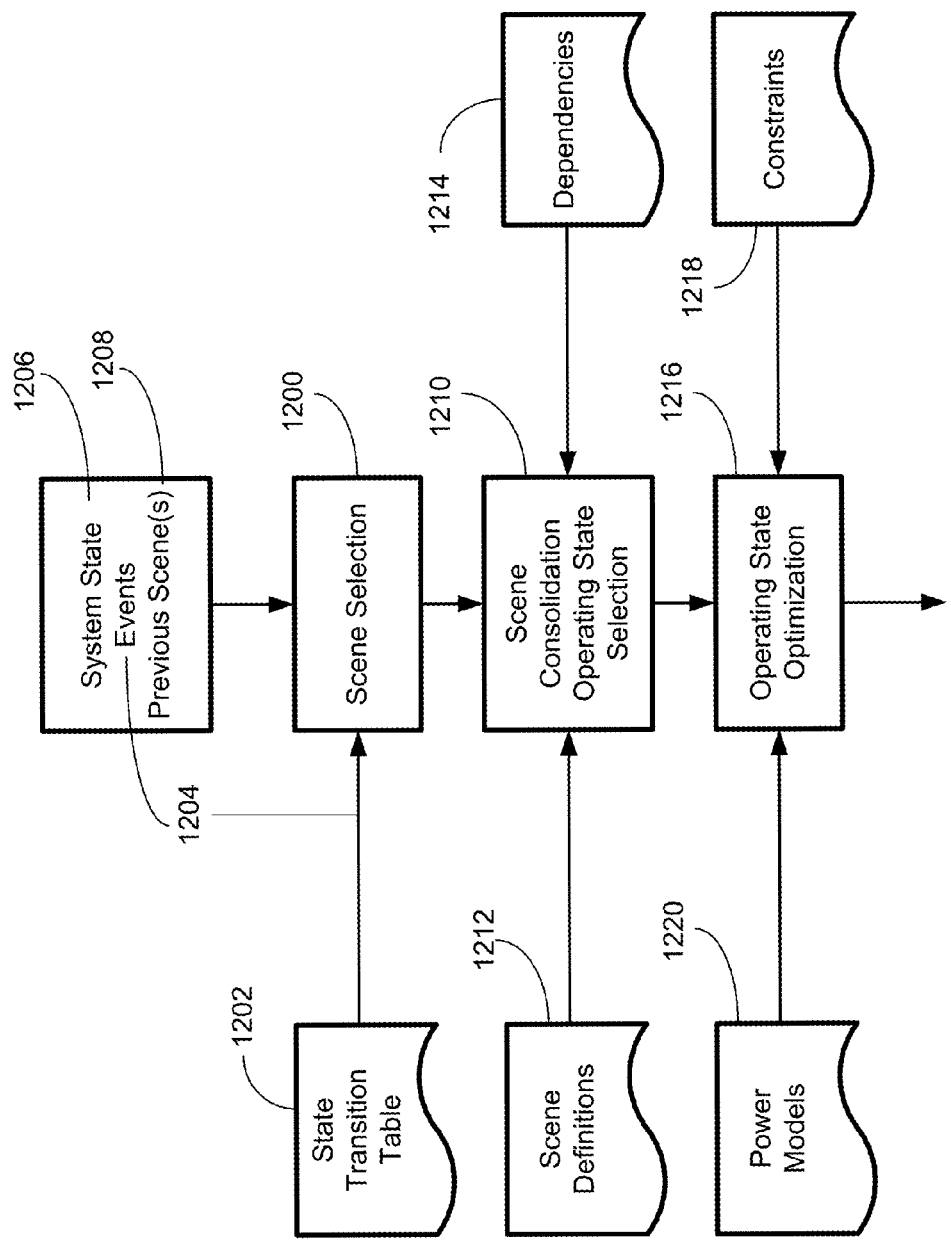
FIG. 12 is a block diagram illustrating the operating state selection process.

FIG. 12 is a block diagram illustrating the operating state selection (and optimization) process. The scene selection 1200 picks new scenes according to a state transition table 1202 where the transition table defines the conditions for when to transition to a new scene and evaluates incoming events 1204, system state 1206, and previous scene(s) 1208 to determine the new scenes accordingly. The result is a set of scenes to be entered, which is passed to the scene consolidation logic 1210.

The scene consolidation involves the selection of component operating states that provide the required capabilities and performance for all newly selected scenes according to the scene definitions 1212. Operating state changes due to dependencies 1214 specified at the component level may also be required. Conflicts may be resolved by adhering to priorities of scenes, and combining scenes of equal priority by satisfying requirements of each scene. The result is a preliminary set of operating states/points that fulfills the needs of the new scenes. If the host operating system is in charge of the functional operating state of the components then the energy management system will limit itself to only changes in performance operating states, also known as operating points. Otherwise, the energy management system may change both the functional as well as performance operating states.

The operating state optimization step 1216 is added to reduce the probability of constraint violations and to minimize the overall energy consumption. It may take into consideration constraint models, e.g. relationships between component settings and operating characteristics. It may also take into consideration all knowledge about currently active tasks, e.g. expected duration, expected resource requirements, etc. If constraint violation 1218 probability is greater than a defined threshold, try to find operating points that can reduce likelihood of constraint violations. Based on tasks currently running and power models 1220 for the components, find operating points that can reduce overall energy consumption, even if that means temporarily increasing power consumption in order to finish a task sooner. The result is the final set of operating states/scenes, optimized against constraints and to minimize energy consumption.

Figure 13:
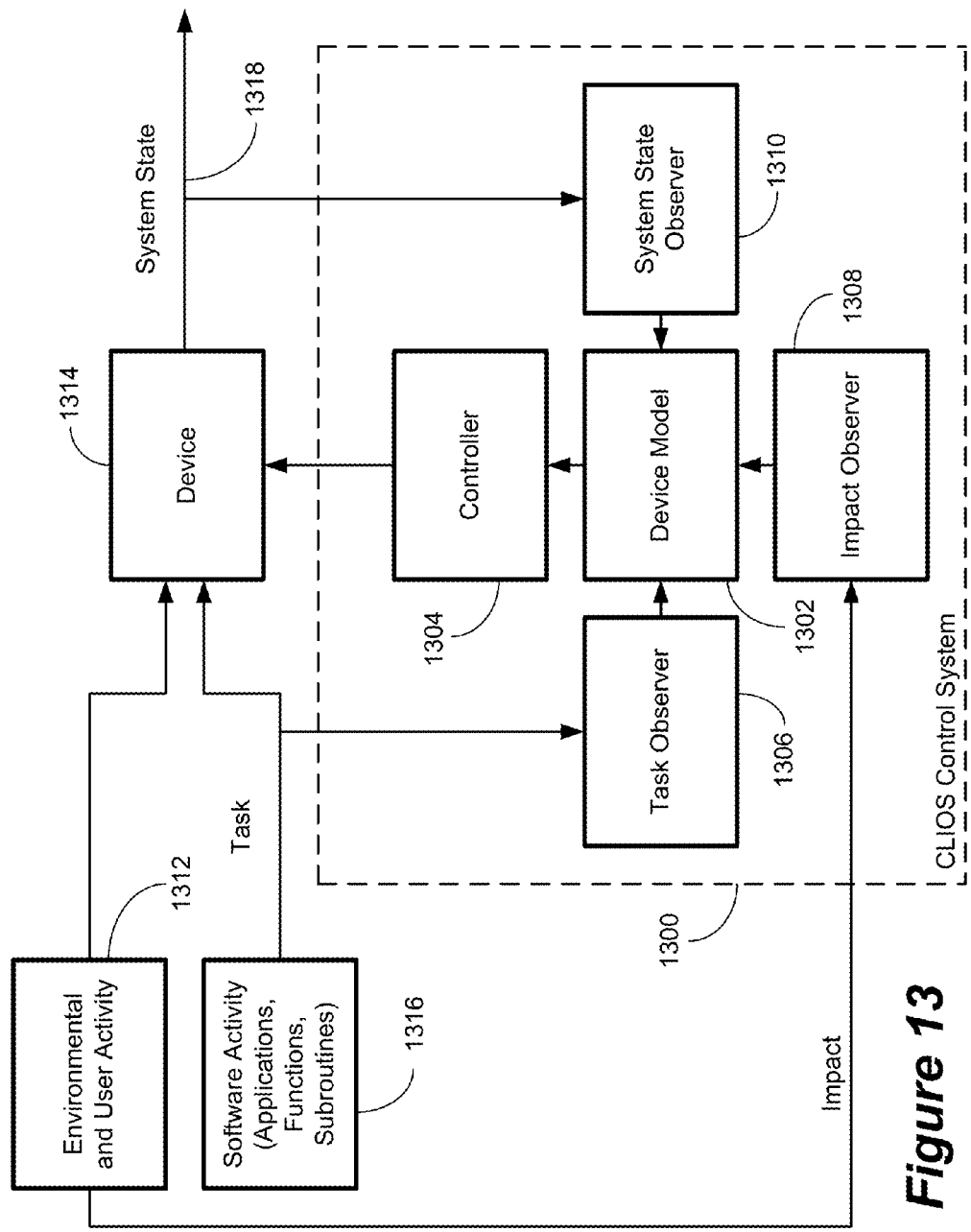
FIG. 13 is a block diagram illustrating the CLIOS model of computation.

FIG. 13 is a block diagram illustrating the CLIOS model of computation. The CLIOS control system model 1300 of computation comprises a device model 1302 and a controller 1304, as well as several observers 1306, 1308 and 1310. The controller sets the component operating states based on the input from the device model 1300. This input comprises the current system state, the new scenes to be set, as well as the system constraints and component dependencies.

Through respective observers the device model 1300 keeps track of the current system state, events, as well as the software. The system state observer processes measurements from built-in telemetry hardware, measuring physical properties such as current, voltage, or temperature, as well as determining safety and security levels. Where hardware telemetry is not available, virtual measurement nodes can be used to deduce power consumption or temperature by looking at secondary data such as bus activity, CPU load, etc.

Another key element of the CLIOS control system 1300 is the introduction of the task observer 1306 and the impact observer 1308. These observers 1306 and 1308 allow CLIOS to make pro-active decisions based on software activity or environmental and user events, as opposed to just reacting to state changes. The task observer 1306 is used to keep track of activity in the software. Here a task can represent any piece of user-space or kernel-space software, ranging from a complete application to a sub-routine or algorithm. The impact observer 1308 notifies the device model 1302 of all relevant environmental and user events. Based on this input the device model 1302 decides when to transition to a new scene. The controller 1304 then conducts the scene transition by changing the state of individual components accordingly.

The environmental and user activity 1312 provides input to the device 1014. The environmental and user activity 1312 also provides input to the impact observer 1308. Likewise, the software activity 1316, e.g. applications, functions and subroutines provide input to the device 1314 and to the task observer 1306. From these inputs, the CLIOS control system 1300 provides input to the device model 1302, which provides input control to the controller 1304. The controller 1304 provides input to the device 1314, which produces its system state 1318. This system state is the input to the system state observer 1310, which also provides input to the device model 1302, which provides input to the controller 1304 further influencing the device 1314.

Energy Manager Hardware.

Figure 14:
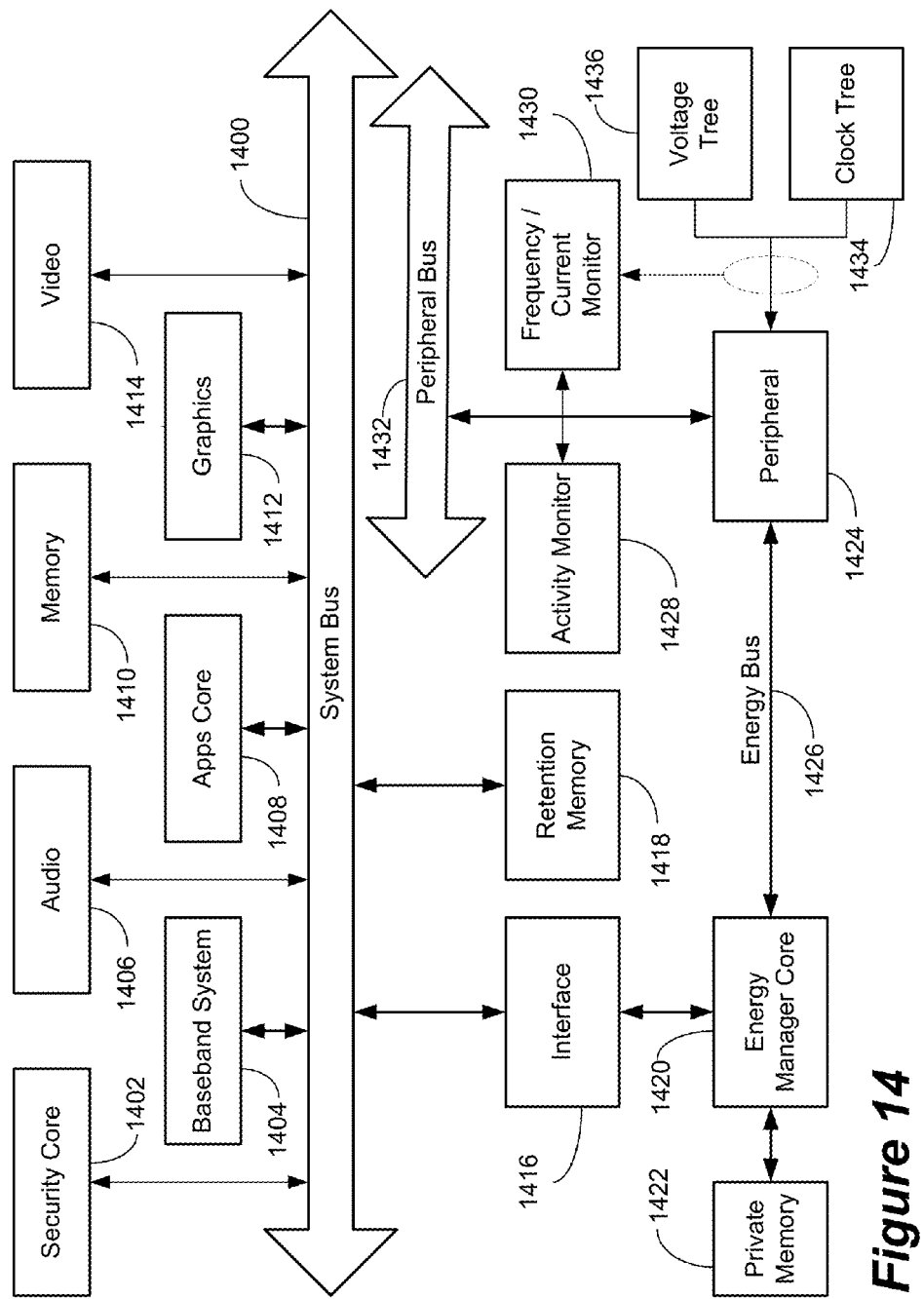
FIG. 14 is a block diagram illustrating the hardware components of a typical device.

FIG. 14 shows the various hardware components of a typical device. The device comprises a system bus 1400 interfacing with security core 1402, baseband system 1404, audio 1406, apps core 1408, memory 1410, graphics 1412 and video 1414. Also connected to the system bus 1400 is interface 1416 and retention memory 1418.

The hardware of the energy manager comprises the energy manager core 1420, which connects to the private memory 1422, and the peripheral 1424 via the energy bus 1426. The peripheral 1424 is connected to the activity monitor 1428, the frequency/current monitor 1430, and the peripheral bus 1432. The frequency/current monitor 1430 monitors the clock frequency from the clock tree 1434 and the voltage from the voltage tree 1436.

The energy manager hardware typically comprises: (1) off-the-shelf processor, customizable processor or programmable finite state machine; (2) interface of the energy manager core 1402 to the system, peripheral bus 1432 or specialized bus structure; (3) customizable energy management bus structure 1426; (4) private memory 1422 attached to the energy manager core 1420 to hold the state of all components and the scene management rules; (5) current and frequency monitor 1430 for every component, including the main processor, auxiliary processors, memory subsystem, peripherals; (6) functional activity monitor 1428 (e.g. to detect idle states of components) for every component; and (7) retention memory 1418 to hold the retention state of the components.

Optimized System for Device Energy Management.

Figure 15:
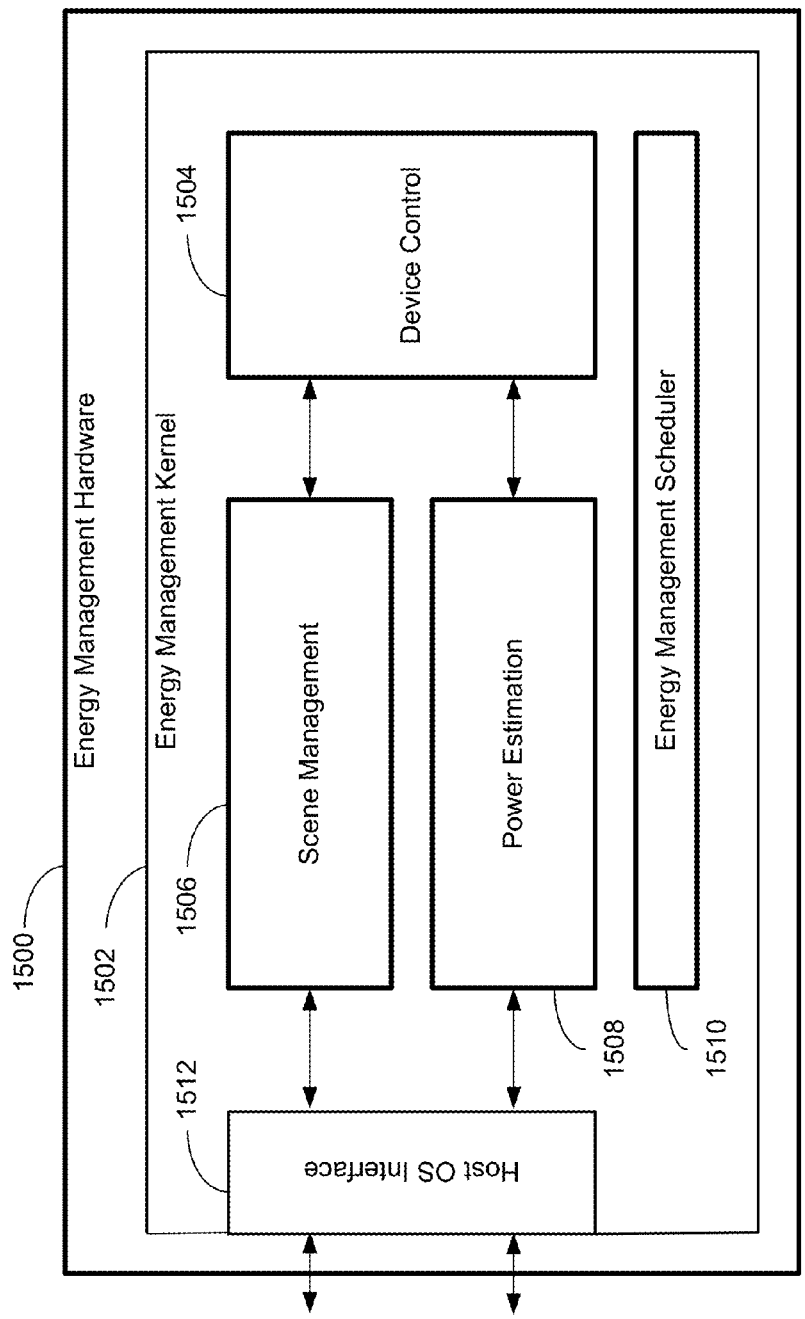
FIG. 15 is a block diagram illustrating various components of modules comprising the energy management kernel.

FIG. 15 is a block diagram illustrating the energy management system. In most cases an energy management hardware component 1500, such as a dedicated microcontroller is hosting the energy management kernel 1502 that comprises five major modules: (1) Device Control Logic 1504 that provides for the setting of operating states; (2) Scene Management Logic 1506 that provides for detection and setting of scenes; (3) Power Estimation Logic 1508 that provides for estimation and prediction of power and energy consumption; (4) Energy Management Scheduler 1510 handling scheduling of software and maintenance tasks; and (5) Host OS interface 1512 which allows the energy management system to coordinate with the main operating system of the device.

The device control logic module 1504 manages the control-related state of each device in the system. Device state changes can be performed either by configuring the device itself, by configuring or gating the devices clock(s), by asserting the reset signal, and/or by altering or turning off the voltage rail for the device. The device control logic module 1504 is aware of dependencies between the devices in their different states and can enforce the dependencies so that they are being honored, either by preventing new states from being entered or by propagating the state changes to all the dependent devices. The device control logic module 1504 also keeps a usage counter for each device so it knows whether active devices can be put into a low-power state.

When putting a device into a low-power state will cause the loss of the current device state, the device control logic will save the device context to a memory location. The scene management logic 1506 sits on top of the device control logic 1504. Scene management 1506 is implemented as a finite state machine. Scene transitions are initiated by events that can be triggered by hardware components, by software tasks, as well as by user-space impacts. The next scene is then selected based on the current scene, the incoming event, and the current state and performance constraints defined by the currently running tasks. Each scene may require a subset of the available hardware devices to be in specific operating states. If a transition into a new scene is initiated, the device control logic is used to perform the necessary state changes within the components.

The task scheduler allows running energy management tasks in the background in case the auxiliary core is used to run other tasks as well. It is able to identify performance-critical energy management tasks and prioritize them accordingly, while running non-critical tasks with minimal impact to existing applications. The host OS interface uses an inter-processor-communication mechanism to interact with the energy management driver in the host OS.

The energy management system also includes power and energy estimation logic, which relies on "virtual measurement nodes". Power and energy are estimated based on available power and energy annotations for each scene, as well as for each device. Whenever a power-relevant state change occurs, an updated power or energy estimate is computed and transmitted to the energy management kernel. Power and energy estimates can be computed for the entire system, as well as for each virtual measurement node that is defined in the system.

Run-Time Energy Measurements Using Virtual Measurement Nodes.

Figure 16:
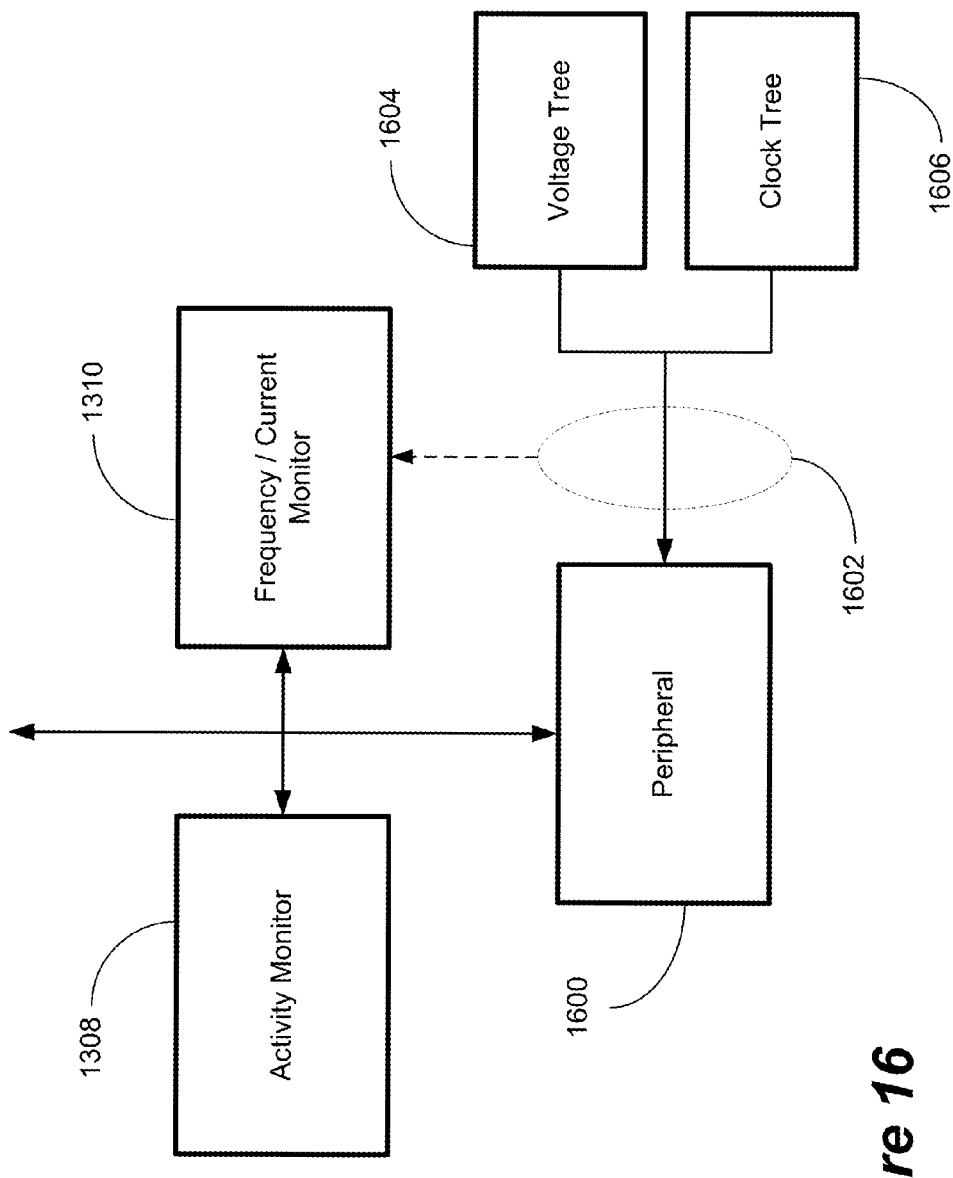
FIG. 16 is a block diagram illustrating virtual measurement nodes connected to a peripheral component.

FIG. 16 is a block diagram that illustrates a component such as a peripheral 1600, with the voltage connection 1602 over the voltage tree 1604 and clock connection over the clock tree 1606. The component is connected with the rest of the system over a bus, which supports the exchange of data between the components and other parts of the system, including the energy manager.

FIG. 16 also shows two monitoring components or measurement nodes, the activity monitor 1608 and the frequency/current monitor 1610. In one embodiment, these components may be implemented as hardware components and provide real-time activity, frequency, current, power, energy or thermal information to the energy manager. The goal is to conduct independent and non-intrusive real-time observations of all these measurements for all components of the device.

In certain cases of practical significance it is costly or technically impossible to insert such physical monitoring components in the hardware of the semiconductor component, the PCB board or in the actual device itself. In such cases, the physical measurement nodes can be replaced with their virtual counterparts. Instead of providing physical measurements, such virtual measurement nodes are represented as software components running on the auxiliary or main core which continuously estimates the physical values based on the component specification, the physical measurements with external equipment during test runs and the algorithms relating other physical and virtual measurements conducted to the component which is monitored, e.g. measured values. The energy managing software controls and monitors the virtual measurement nodes in the same way as physical nodes.

The tuning of the virtual measurements nodes is conducted with the help of the external measurement equipment connected to all externally accessible clock and voltage signals, e.g., voltage rails. During that process the device is transitioned through a series of typical scenes and operating states and measurements are made. Using standard linear prediction or other more sophisticated algorithms, the values of the predicted measurements are calculated. As an example, using the activity information of the component and its frequency settings it is possible to estimate the average current into the component and its temperature.

EnergyLab Tool.

Figure 17:
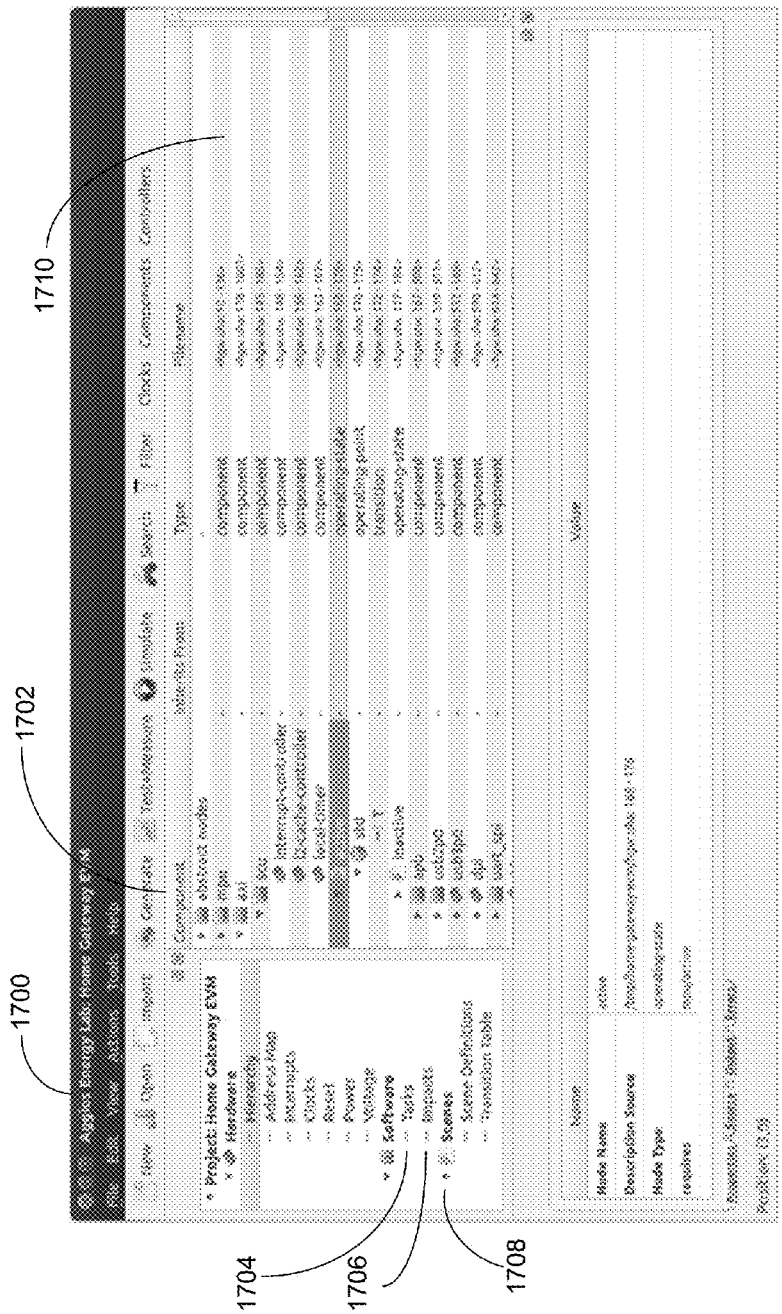
FIG. 17 is a screenshot of the EnergyLab graphical user interface illustrating the design tool.

FIG. 17 is a screenshot illustrating the EnergyLab tool 1700, which is used as the design, visualization, generation and test/measurement cockpit for all power related activities. The EnergyLab tool may be used to create, manage, and optimize the UHA description of the targeted electronic device. It is also useful as a control cockpit for the configuration and parameterization of the CLIOS software, which can be generated out of the UHA description.

The design tool graphical user interface 1700 can identify components, tasks, impacts and scenes. Within the components designation 1702, the graphical user interface 1700 can support the selection of hierarchy, address map, interrupts, clocks, resets and voltage domains. Within the tasks 1704, the graphical user interface 1700 can support the task definitions. Within the impacts 1706 the graphical user interface 1700 can support the impact definitions. Within the scenes 1708, the graphical user interface 1700 can support the definitions and the transition table. The graphical user interface 1700 is used as the design, visualization, generation and test/measurement cockpit for all power related activities.

The users of the EnergyLab tool can: (1) create and edit descriptions of the hardware and software details of their systems; (2) export and import a variety of system and power description formats, including DTS, UPF and IP-XACT; (3) represent the device and component hierarchy in graphical and tabular format; (4) enter and represent the Finite State Machines ("FSMs") as state transition tables ("STT") or diagrams; (5) verify the validity and consistency of the description; (6) create and manage the descriptions of devices and components (UHA library of components and devices); (7) generate the CLIOS driver and user space daemon as well as the CLIOS kernel for the auxiliary core or cores; (8) automatically generate the software for the energy manager as shown on FIG. 4; (9) automatically generate the hardware for the energy manager as shown on FIG. 14; (10) run the generated energy manager software on the generated or standard hardware; (11) automatically generate equipment setup to make tests and measurements using external instruments for measuring current, voltage, power, energy and thermal characteristics; and (12) simulate power management scenarios on a FPGA and virtual prototypes. The EnergyLab tool may be integrated with physical power measurement and data acquisition (DAQs) devices for automated measurement, test and verification of the power and energy data collected from multiple voltage rails, supply inputs and battery contacts.

Design Tool.

The EnergyLab tool is used to create, manage, and optimize the UHA description of the targeted electronic device. It is also used as a control cockpit for the configuration and parameterization of the CLIOS software, which can be generated out of the UHA description.

General Principle of Operation.

The EnergyLab tool relies on UHA files to store the information about the current system. Additionally the EnergyLab tool uses proprietary project files to store additional details about the system that are not stored in UHA files. When a particular project is opened, the UHA files can be parsed and transformed into an intermediate representation ("IR"). EnergyLab features may operate on the IR until the user decides to save the project, at which point, the contents of the IR may be written back into the UHA files of the project, as well as EnergyLab's proprietary project file format.

Preservation of UHA File Details.

All details contained in the UHA files of a project are preserved by the EnergyLab tool. This includes formatting and source code comments, as well as file structure and hierarchies. This means that if the EnergyLab tool is used on a set of pre-existing UHA files, the formatting in those files gets preserved, allowing the user to continue using the source files even after using the EnergyLab tool to view, edit, or extend the system description. This principle will also allow users to keep the UHA files in a revision control system, such as GIT or SVN, without losing the ability to merge changes with other users who manually edit the UHA files.

Window Structure.

The tool is organized into four main areas: (1) the menu on top; (2) the project overview and perspective selector (default location: left); (3) the main view (default location: right); and (4) the details view (default location: bottom).

Project Overview and Perspective Selector.

The EnergyLab tool allows viewing the contents of the UHA system description from different perspectives. The selected perspective is shown in the main view area. Perspectives are grouped into hardware-focused perspectives, software-focused perspectives, as well as system-focused perspectives. The default is the hierarchy perspective, which provides a comprehensive tree-based representation of the complete description. Currently, the offered perspectives are: (1) hierarchy: tree-based representation of complete description; (2) address map: table-based representation of all components that are memory mapped; (3) interrupts: tree-based representation of all components connected to one of the interrupt controllers of the system; (4) clocks: tree-based representation of the clock hierarchy and all components connected to one or more of the clocks; (5) reset: tree-based representation of the reset hierarchy and all components connected to one or more of the reset lines; (6) voltage: tree-based representation of the voltage rail hierarchy and all components connected to one or more of the voltage rails; (7) power: tree-based representation of the power domain hierarchy and all components connected to one or more of the power domains; (8) tasks: tree-based representation of the task hierarchy; (9) impacts: tree-based representation of the impact hierarchy; (10) scenes: table-based representation of all scenes; and (11) scene-transitions: table-based representation of the scene transitions.

Main View.

The main view area shows the contents of the selected perspective, which can either be tree-based or table-based. If the displayed items do not fit into the view area, a vertical scrollbar allows the user to scroll the view to the desired item(s).

In-Line Editing.

All perspectives shown in the main view allow in-line editing, i.e. the user can change all information displayed in the respective view, and the changes can be saved back to the UHA files.

Searching.

All perspectives allow searching for particular nodes either by name or by other properties. If a node has been found, it will be highlighted in the main view. If necessary, the respective tree branch will be expanded first. If more than one node meets the search criteria then the first matching item will be shown highlighted and pressing the "Find" button subsequently will advance to the next matching item.

Filtering.

All perspectives allow filtering by certain criteria. Only the nodes matching the filter criteria will remain in the view, while the other ones will be hidden. Parents of nodes matching the filter criteria will also be shown as necessary in order to keep the tree hierarchy intact.

Tree-Based Perspectives.

All tree based perspectives show the top-level nodes by default. The existence of child-nodes is indicated by a small triangle before the node name. Clicking onto that triangle expands the view to reveal the set of immediate children of that item. This way the entire hierarchy of the selected perspective can be explored. Tree based perspectives can have multiple columns where the main item name is usually shown in the first columns, while additional information can be shown in the remaining columns.

Drag-and-Drop.

The hierarchy can be changed using drag-and-drop functionality and the nodes can be moved from one parent to another.

Table-Based Perspectives.

The table based perspectives always show all rows at once. The user has the ability to change the sorting order by clicking the header row of the desired sort-by column.

Address Map Editor.

The address map editor offers a convenient method for viewing, defining, editing, as well as consistency checking of the system's address mapping. Components typically have addresses where their configuration registers are reachable by access on a parallel bus or by an ID on a serial bus.

Drag-and-Drop.

The memory mapping of components can be changed by dragging and dropping the component to a different location in the address space. The address map editor will typically only allow the dropping of a component into areas with sufficient free space. Otherwise, it will ask the user how to resolve the conflict, either by moving the conflicting component to a different area, or by moving all components above that address to the next available address, by a user-defined default increment, or by ignoring the conflict if the user plans on fixing the issue manually.

Consistency Checking.

The address map for the system may be designed to continuously check for consistency. Any change made to the address map, either in the address map editor, in one of the components' properties, or in the UHA source code, will immediately or after a short period of time lead to a re-checking of the address map. Conflicting areas (overlapping of mapped areas) will be highlighted in red color inside the address map view.

Details View.

The details view includes multiple tabs offering additional details to be displayed.

Properties Tab.

The properties tab shows details about the selected node, including all properties and all parameters, as well as information about the source file and line number where the UHA source code for that component can be found. Changes to any of these properties or parameters are remembered and can be written back to the UHA source code.

Reference Link Navigation.

Any property that references another node, allows cross navigation by double-clicking on the referenced component name. This will highlight the referenced component in the current perspective in the main view area. If the referenced component is not present in the current perspective then we switch to the hierarchy perspective.

Source Tab.

The source tab shows the complete raw source code of the currently selected node. If the source code is edited inside this tab that portion of the source code may be re-parsed and the intermediate representation is updated, so that any other view showing this node will reflect the changes made.

Output/Messages Tab.

All messages printed by the tool, including info-messages, warnings, as well as errors are shown in this view. If a message refers to a specific line of UHA source code then clicking on that message opens the UHA source file in the default editor.

Errors Tab.

To be shown in the message tab, any error messages printed since the EnergyLab tool was opened well. The error tab only appears if at least one error message has been printed. If a message refers to a specific line of UHA source code then clicking on that message opens the UHA source file in the default editor.

Persistency.

In order to improve user experience, all selections and configurations the user has made are saved in between sessions. This includes, but is not limited to: (1) the size and position of windows; (2) the font size; (3) the position of slider bars; and (4) the expanded/collapsed state.

Wizards.

The EnergyLab tool makes it easy to create all possible types of UHA nodes using dedicated wizard dialogs, which walk the user through the component creation process step by step. For each node the respective wizard will require that all mandatory properties be populated. Additionally other standard or user-defined custom properties can be added. Any property value can be entered as text, but for every standard property the wizard will also allow the user to select the property value from the applicable choices using a drop-down box. For properties referencing other nodes, the EnergyLab tool will let the user choose from a list of all eligible nodes.

Component Wizards.

The component wizards are used for creating new hardware components, including their address mapping and interrupt mapping as well as connections to clocks, reset lines, voltage rails, and power domains.

Operating States Wizard.

The wizard for operating states allows easy creation of a complete set of functional and performance operating states for a component. For each of the performance operating states, called UHA operating points, the user can choose the necessary settings of the clocks, reset lines, voltage rails, and power domains the component is connected to. For performance operating states that require complex transitions, the wizard allows to define those as well, either in a generic manner, i.e. without regard to the prior state, or specific to one operating point (point to point transition). A complex transition is defined through a set of register settings, delays, as well as C-behaviors that are processed sequentially by CLIOS.

Task Wizard.

Tasks and their energy profiles can be created using the task wizard. The energy profile can either be imported from a table (CSV or TSV) or it can be entered directly in the wizard. Energy profiles can be general for the entire device, or they can be broken down by voltage rail, or even specific to individual components involved in the task.

Impact Wizard.

The impact wizard allows users to define all aspects of an impact, including the connection to the interrupt triggering the impact.

Scene Wizard.

The scene wizard is used for creating system scenes, where one can interactively select the required functional and/or performance operating states for all components relevant to that scene.

Figure 18:
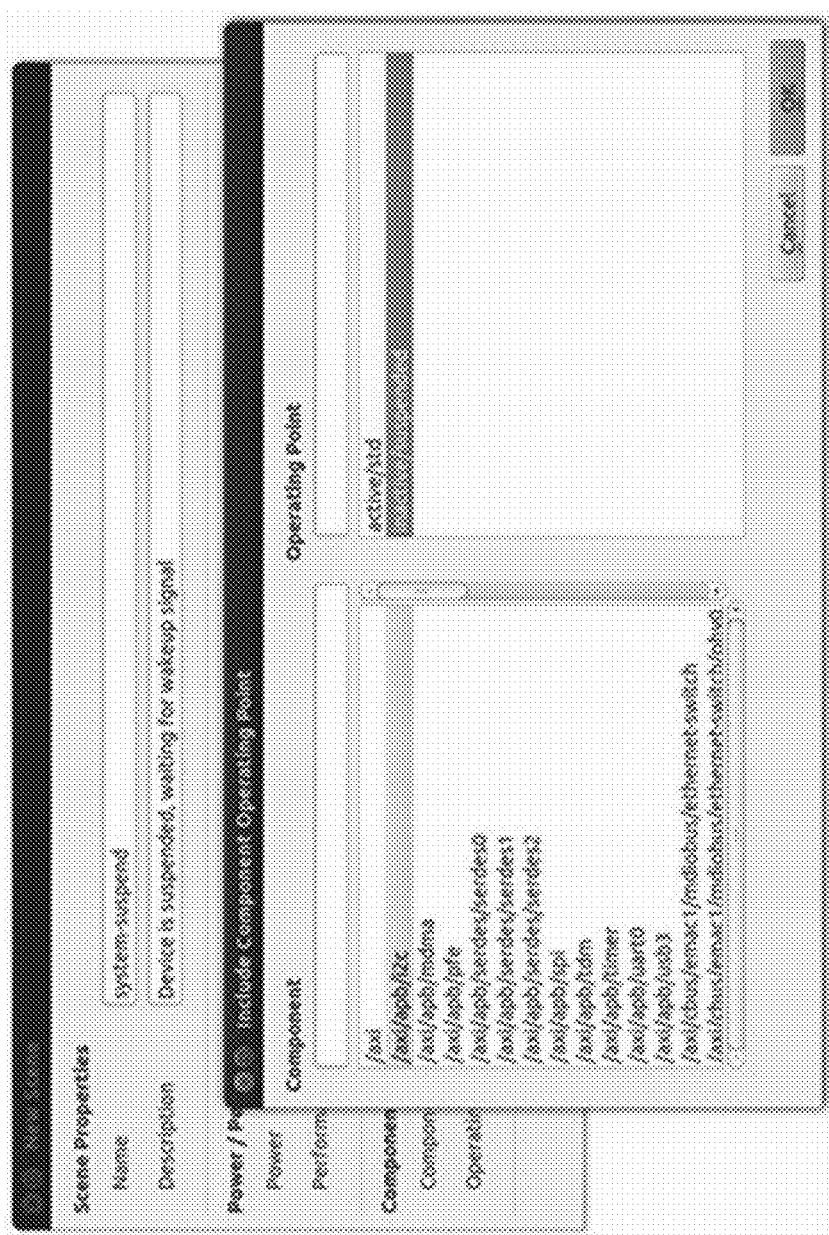
FIG. 18 is a screenshot of the EnergyLab graphical user interface supporting the selection of operating points for components in the scene wizard.

FIG. 18 is a screenshot of the Energylab graphical user interface supporting the selection of UHA operating points for components in the scene wizard. The scene wizard further allows specification of expected power figures for that scene, including minimum, maximum and expected average power. The power figures can be entered manually by the user, or the wizard can suggest a power figure, based on the combined power numbers from the components included.

The scene wizard further allows specifying expected power figures for that scene, including minimum, maximum and expected average power. The power figures can be entered manually by the user, or the wizard can suggest a power figure, based on the combined power numbers from the components included.

Scene Transition Wizard.

New entries in the scene transition table are created by using the scene transition wizard. A scene transition is defined by the triggering event, the "from" scene and the "to" scene. Each of those can be selected from their respective dropdown boxes. Additionally the conditions that need to be checked, as well as side-effect actions can be specified here.

Figure 19:
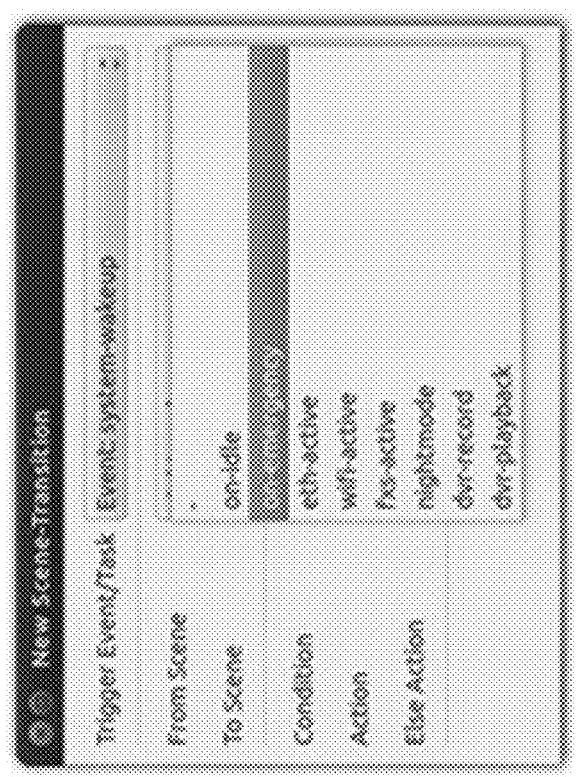
FIG. 19 is a screenshot of the EnergyLab graphical user interface illustrating the scene transition wizard.

FIG. 19 is a screenshot of the Energylab graphical user interface illustrating the scene transition wizard. When a new property is being added, the "new property wizard" will allow the user to select the data type of the property, and then offer a data type specific entry mask for the value of the property.

Wizard for Adding Parameters.

The "new parameter wizard" makes it easy to create component parameters. Depending on the kind of component the parameter is for, it allows the user to select the specific parameter type from a list of eligible types, then depending on the type, it lets the user enter the mandatory as well as optional or user-defined properties.

Generating Code.

Figure 20:
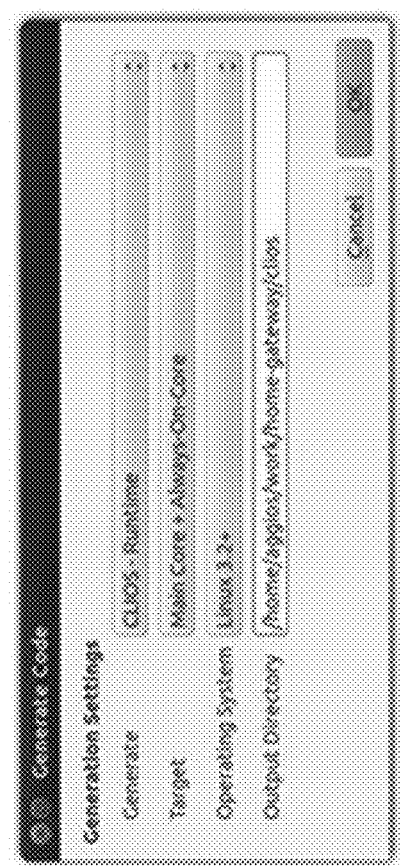
FIG. 20 is a screenshot of the EnergyLab graphical user interface illustrating options for generating CLIOS.

The "Generate" feature of the EnergyLab tool allows for the generation and configuration of different variants of CLIOS, for different targets running different operating systems. FIG. 20 is a screenshot of the Energylab graphical user interface illustrating options for generating CLIOS code. The generation options include various components of the CLIOS runtime software, the CLIOS simulator, as well as a CLIOS state machine description that can be mapped to dedicated power management hardware.

Figure 21:
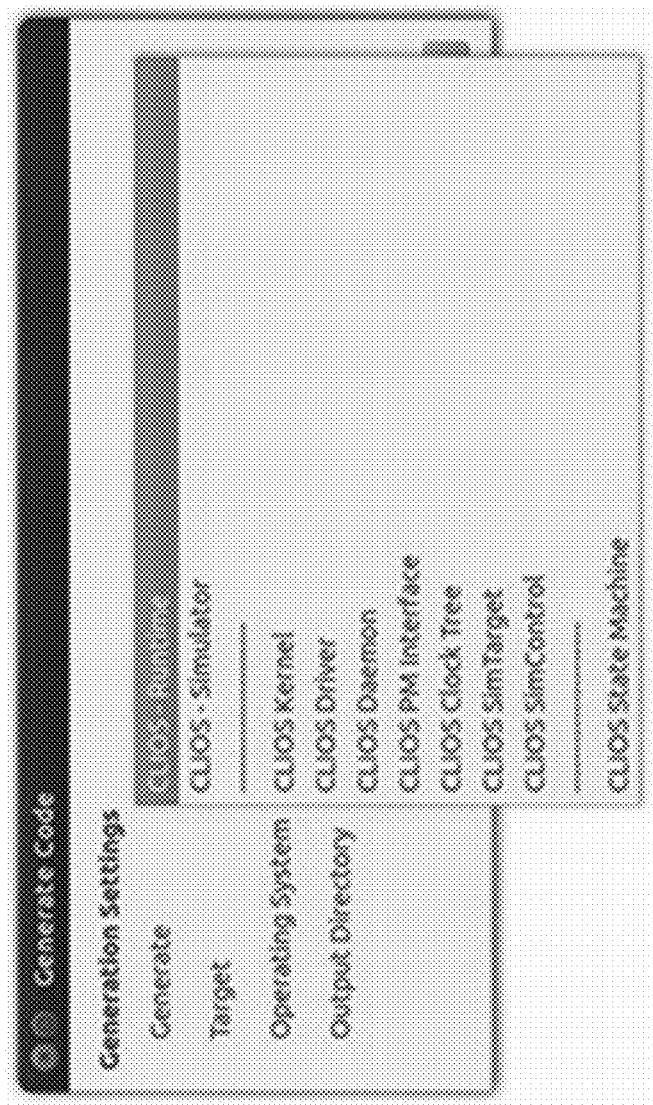
FIG. 21 is a screenshot of the EnergyLab graphical user interface illustrating the different variants of CLIOS that can be generated.

FIG. 21 is a screenshot of the Energylab graphical user interface illustrating the different variants of CLIOS that can be generated. When selecting the target, CLIOS can either run on both the main core and an auxiliary core, or it can run entirely on the main core or entirely on the auxiliary core. An additional option may be dedicated power management hardware, which must be selected when generating a CLIOS state machine.

Figure 22:
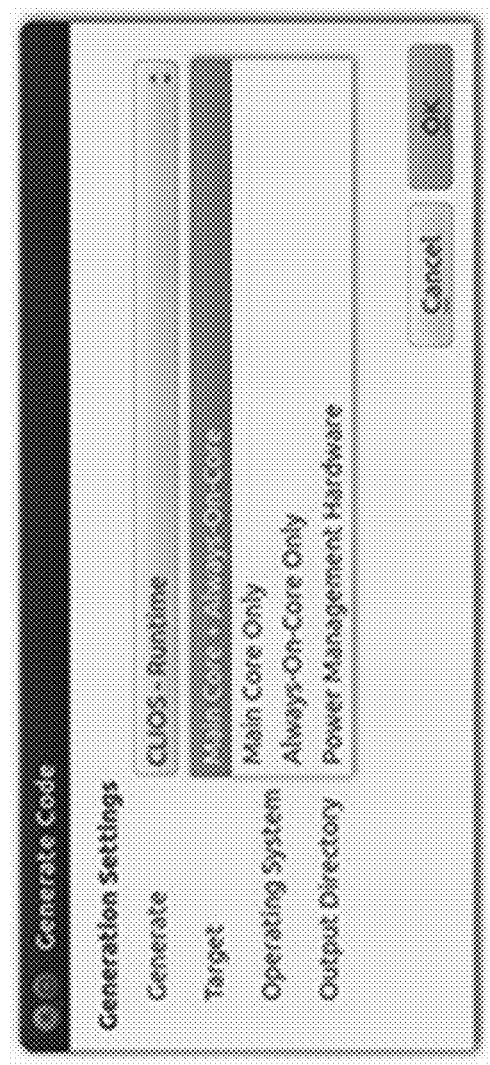
FIG. 22 is a screenshot of the EnergyLab graphical user interface illustrating the selection of different target configurations for CLIOS.

FIG. 22 is a screenshot of the Energylab graphical user interface illustrating the selection of different target configurations for CLIOS. The specified output directory may or may not contain an existing CLIOS framework, however, the generated files will fit into the existing framework.

Importing of Other Description Formats.

EnergyLab supports importing of other description formats, including Device Tree Source ("DTS") files as well as the Unified Power Format ("UPF"). Importing can be done to add on to an existing project, or when starting a new project from scratch.

Device Tree ("DTS") Import.

As UHA is a proper superset of the device tree format, EnergyLab supports all features of Device Tree. When importing, EnergyLab preserves all Device Tree information in the UHA description. Both the DTS as well as DTSI file extensions are supported. All files included by imported DTS files may also be imported as well. When importing into an existing description it is possible to choose an existing node below which the imported DTS description will be placed.

Unified Power Format (UPF) Import.

UHA can also import UPF files, extracting relevant information about voltage rails and power rails.

Integration with Measurement Equipment.

EnergyLab provides integration with measurement equipment allowing the combination of information about the measured metrics (e.g., current, voltage, power, temperature) with CLIOS state information (e.g., active tasks and impacts as well as active scenes).

Data Acquisition (DAQ) Coupling.

EnergyLab supports coupling with various multi-channel high-precision data acquisition (DAQ) devices via their programming APIs as well as through their log files. Optionally, CLIOS is capable of using one of the DAQ channels (for example via a GPIO pin connected to an analog or a digital input at the DAQ) to encode event information, so that the occurrence of relevant events (task starts, impacts, scene changes) can be time-stamped and put in perspective against measured data about power or temperature.

Telemetry Coupling.

Telemetry information can also be fed into EnergyLab through tracing, via USB, or via GPIO pins connected to digital inputs in the DAQ device.

Simulation—CLIOS Simulator.

Using the EnergyLab tool one can generate a CLIOS simulator. The CLIOS simulator constitutes a virtual version of the CLIOS energy management software running on a high level representation of the hardware. With the simulator one can exercise simulation scripts containing various scenarios including scene transitions, task and impact combinations, as well as individual component activity. This can be useful for testing the system and component level state management logic, as well as for estimating power and energy consumption in the pre-silicon and post-silicon phase, both for the entire system, as well as for individual voltage rails or even for individual components.

Simulation Window.

Figure 23:
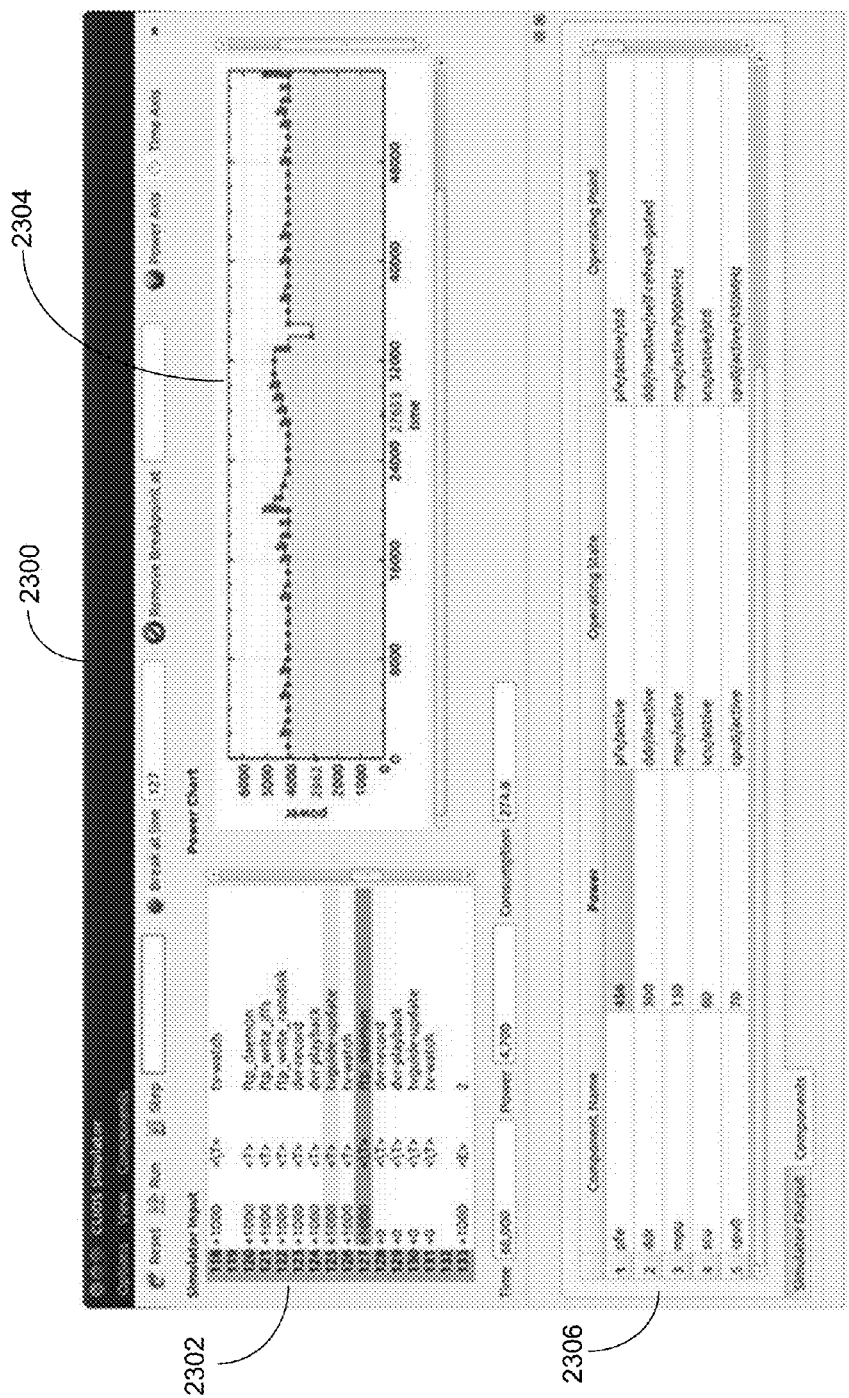
FIG. 23 is a screenshot of the CLIOS simulation window in EnergyLab.

FIG. 23 is a screenshot of the CLIOS simulation window. The CLIOS simulation window 2300 is divided into three (3) main areas. The top left window shows the simulation file 2302, providing the stimulus for the simulation, e.g., scenarios with a timeline of task and impact activity. The top right section 2304 shows a graphical view of the power consumption history alongside a timeline with tasks, impacts, scenes, and scenarios. The bottom section 2306 shows the simulator output as well as a table showing component level power details. The simulator can be configured to issue alerts if component dependencies, latency requirements, or power limitations are violated.

The simulator provides debug features such as single stepping as well as breakpoints. It also supports component based power and state tracing which shows the power consumption graph on a per component basis. The component tab in the bottom section 2306 contains details such as their respective current operating states, their current power consumption, as well as their cumulative energy consumption. The power graph window supports zooming and scrolling, allowing the ability to zero in on specific power events. Hovering the mouse pointer over one of the event dots in the graph window will pop up a tooltip window with information about the event (e.g., task, impact, etc.) as well as the scene at that time stamp.

While various embodiments of the invention have been described, it will be apparent to those of ordinary skill in the art that many more embodiments and implementations are possible that are within the scope of this invention.

What is claimed is:

1. A method for automatically controlling the system state of at least one electronic device, comprising the steps of:
   identifying a hierarchy of hardware components, the hierarchy of hardware components comprising at least a first hardware component that has a hierarchical relationship with a second hardware component, the first and second hardware components having a plurality of operating states;
   generating at least a first scene comprising energy settings for a first operating state of the first hardware component, and at least a second scene that comprises energy settings for a second operation state of the first hardware component, wherein the second scene consumes less energy than the first scene;
   displaying a user interface that allows a user to define triggering events that control scene transitions;
   defining dependencies between the hardware components that define whether the first and second operation states of the first hardware component are dependent on one or more of the operation states of the second hardware component;
   automatically generating energy management software, the energy management software comprising information about at least the first and second scenes, the triggering events that control scene transitions, and the dependencies between the hardware components; and
   automatically controlling operating states of the first hardware component to reduce energy usage with the energy management software by transitioning at least the first hardware component from the first scene to the second scene based on the triggering events and the dependencies between the hardware components.

2. The method for automatically controlling the system state of at least one electronic device of claim 1, where the step of automatically controlling the operating states is configured to minimal energy consumption.

3. The method for controlling the system state of an electronic device of claim 1, where the step of automatically controlling the operating states is influenced by at least one scene that is selected based on a triggering event.

4. The method for automatically controlling the system state of at least one electronic device of claim 1, where the step of automatically controlling the operating states is influenced by at least one scene that is selected based on the electronic device's current system state.

5. The method for automatically controlling the system state of at least one electronic device of claim 3, where the triggering event stems from a constraint violation.

6. The method for automatically controlling the system state of at least one electronic device of claim 3, where the triggering event stems from software activity.

7. The method for automatically controlling the system state of at least one electronic device of claim 3, where the triggering event stems from an environmental influence.

8. The method for automatically controlling the system state of at least one electronic device of claim 3, where the triggering event stems from user influence.

9. The method for automatically controlling the system state of at least one electronic device of claim 3, where the scene has at least one performance operating state.

10. The method for automatically controlling the system state of at least one electronic device of claim 3, where the scene has at least one functional operating state.

11. The method for automatically controlling the system state of at least one electronic device of claim 3, where two or more scenes are selected.

12. The method for automatically controlling the system state of at least one electronic device of claim 11, further comprising the step of resolving conflicting operating states specified by the plurality of scenes.

13. The method for automatically controlling the system state of at least one electronic device of claim 12, where the step of resolving the conflicting operating states is accomplished by choosing the operating states that satisfy functional requirements of the plurality of scenes.

14. The method for automatically controlling the system state of at least one electronic device of claim 12, where the step of resolving the conflicting operating states is accomplished by suppressing a lower priority scene prior to the lower priority scene being activated.

15. The method for automatically controlling the system state of at least one electronic device of claim 12, where the step of resolving the conflicting scene is performed by terminating a currently running scene having a lower priority.

16. The method for automatically controlling the system state of at least one electronic device of claim 1, where the step of automatically controlling the operating states of the at least one component through internal configuration registers.

17. The method for automatically controlling the system state of at least one electronic device of claim 1, where the step of automatically controlling the operating states of the at least one component by gating at least one of the at least one component's clocks.

18. The method for automatically controlling the system state of at least one electronic device of claim 1, where the step of automatically controlling the operating states of the at least one component by changing the frequency of the at least one component's clocks.

19. The method for automatically controlling the system state of at least one electronic device of claim 1, where the step of automatically controlling the operating states of the at least one component by turning off power to the at least one component.

20. The method for automatically controlling the system state of at least one electronic device of claim 1, where the step of automatically controlling the operating states of the at least one component by changing the at least one component's voltage.

21. The method for automatically controlling the system state of at least one electronic device of claim 1, where the system state can operate on data structures generated from a formal description.

22. The method for automatically controlling the system state of at least one electronic device of claim 1, further comprising the step of predicting energy profiles of software tasks in order to tune performance of the operating states of individual components.

23. The method for automatically controlling the system state of at least one electronic device of claim 1, further comprising the step of calculating probability of constraint violations.

24. The method for automatically controlling the system state of at least one electronic device of claim 23, further comprising the step of tuning performance operating states in order to reduce constraint violations.

25. The method for automatically controlling the system state of at least one electronic device of claim 1, where the step of automatically generating the kernel occurs during the production of the at least one electronic device.

* * * * *